(12) United States Patent
Miyazawa

(10) Patent No.: US 7,942,534 B2
(45) Date of Patent: May 17, 2011

(54) PROJECTOR FOR ACHIEVING A WIDE VARITY OF GRADATION AND COLOR REPRESENTATION, PROJECTION SYSTEM, PROGRAM AND RECORDING MEDIUM

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 656 days.

(21) Appl. No.: 11/976,901

(22) Filed: Oct. 29, 2007

(65) Prior Publication Data

US 2008/0106703 A1     May 8, 2008

(30) Foreign Application Priority Data

Nov. 2, 2006    (JP) ................................ 2006-298560

(51) Int. Cl.
     *G03B 21/14*      (2006.01)
(52) U.S. Cl. ............................................ 353/84; 353/31
(58) Field of Classification Search ................... 353/30, 353/31, 84
See application file for complete search history.

(56) References Cited

U.S. PATENT DOCUMENTS

| | | |
|---|---|---|
| 5,650,832 A | 7/1997 | Poradish et al. |
| 2004/0248022 A1 | 12/2004 | Yoshida et al. |
| 2005/0151936 A1 * | 7/2005 | Nonaka ........................... 353/84 |
| 2006/0002109 A1 | 1/2006 | Imade |
| 2006/0077351 A1 * | 4/2006 | Park et al. ....................... 353/31 |

FOREIGN PATENT DOCUMENTS

| | | |
|---|---|---|
| EP | 0 748 128 B1 | 12/2001 |
| JP | A-09-054267 | 2/1997 |
| JP | A-9-163391 | 6/1997 |
| JP | A-2003-121926 | 4/2003 |
| JP | A-2004-045989 | 2/2004 |
| JP | A-2004-163624 | 6/2004 |
| JP | A-2004-325629 | 11/2004 |
| JP | A-2004-341429 | 12/2004 |
| JP | A-2005-043704 | 2/2005 |
| JP | A-2006-011087 | 1/2006 |
| JP | A-2006-017801 | 1/2006 |
| JP | A-2006-251445 | 9/2006 |

* cited by examiner

*Primary Examiner* — Thanh X Luu
(74) *Attorney, Agent, or Firm* — Oliff & Berridge PLC

(57) ABSTRACT

A projector, includes: an illumination device that radiates plural colors of light in a time-sharing manner; a reflective optical modulator that forms, based on input image information, an optical image for each of the plural colors of light radiated from the illumination device in a time-sharing manner; a projection optical device that projects the optical images of the plural colors of light formed by the reflective optical modulator; and a controller that controls the illumination device and the reflective optical modulator, the controller including: an image information analyzer that analyzes the input image information; and an illumination time controller that dynamically changes and controls illumination time of the plural colors of light by the illumination device based on an analysis result by the image information analyzer.

5 Claims, 15 Drawing Sheets

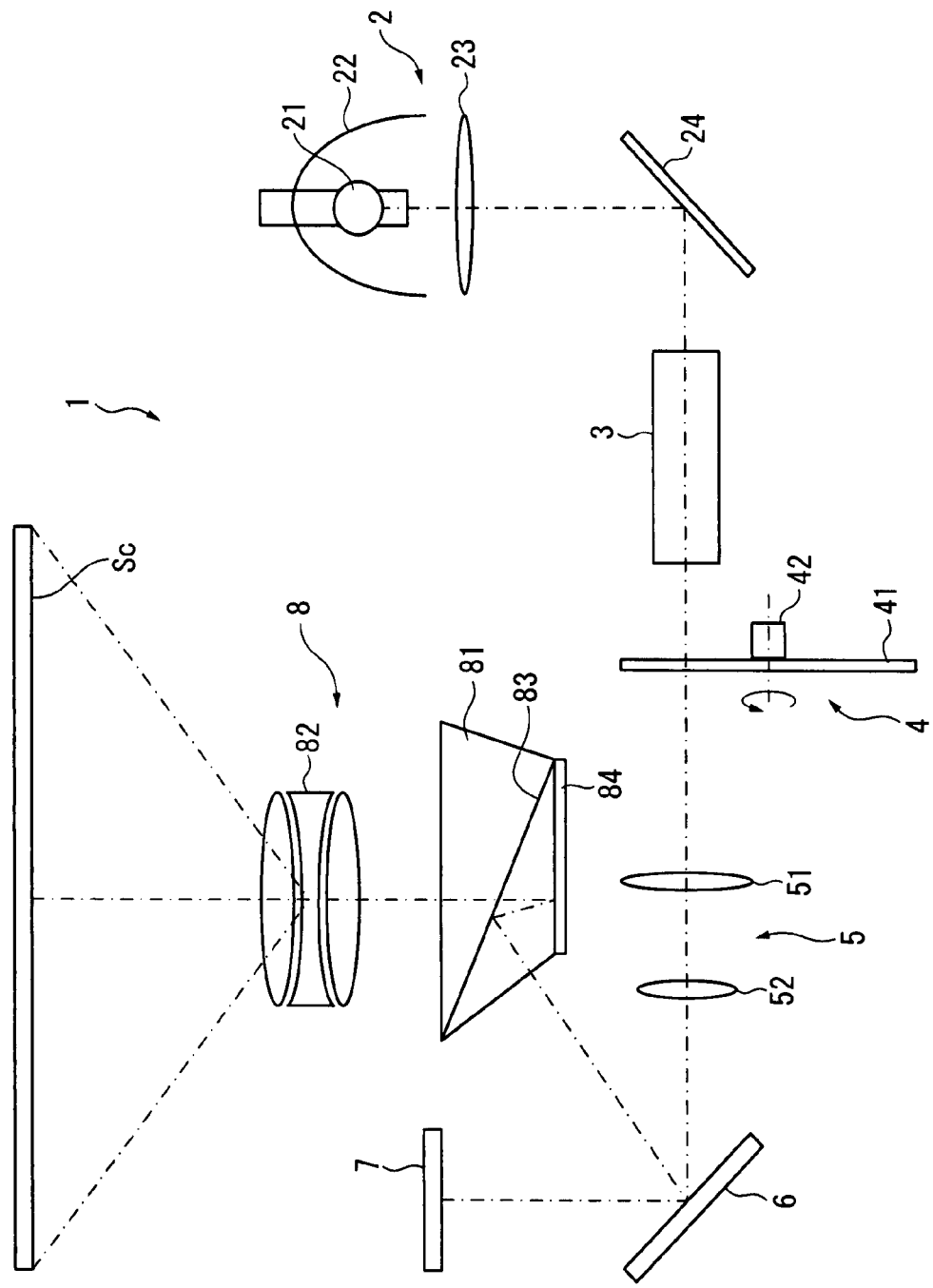

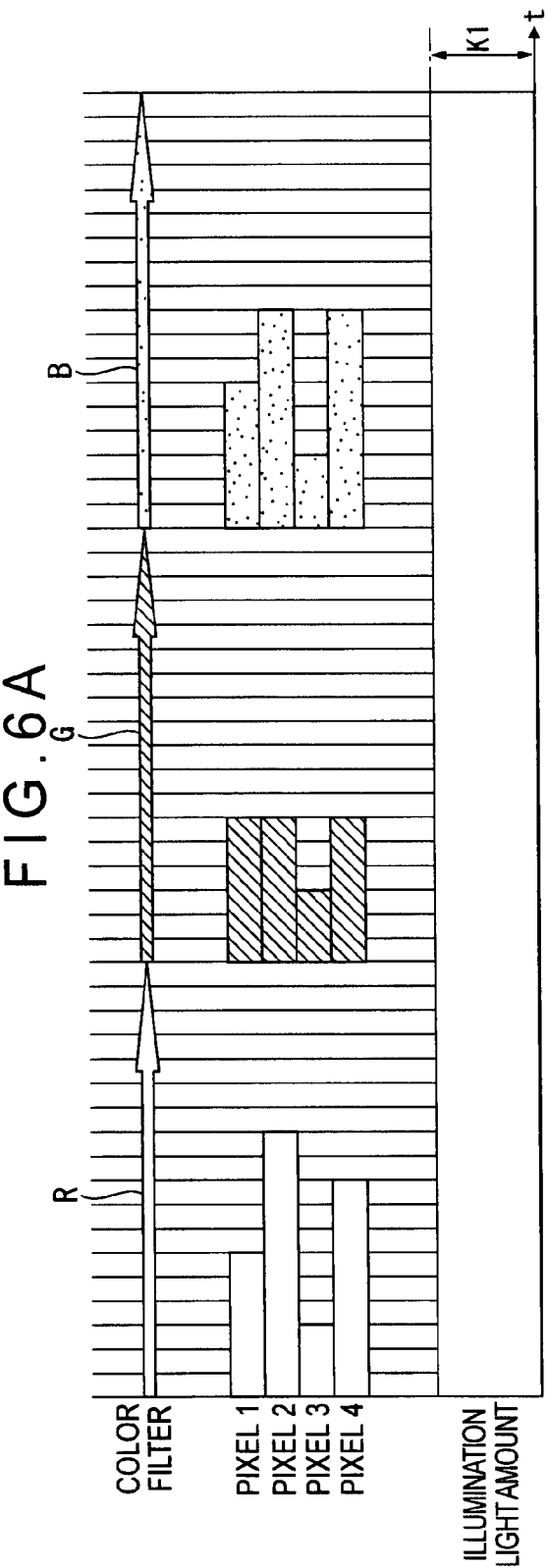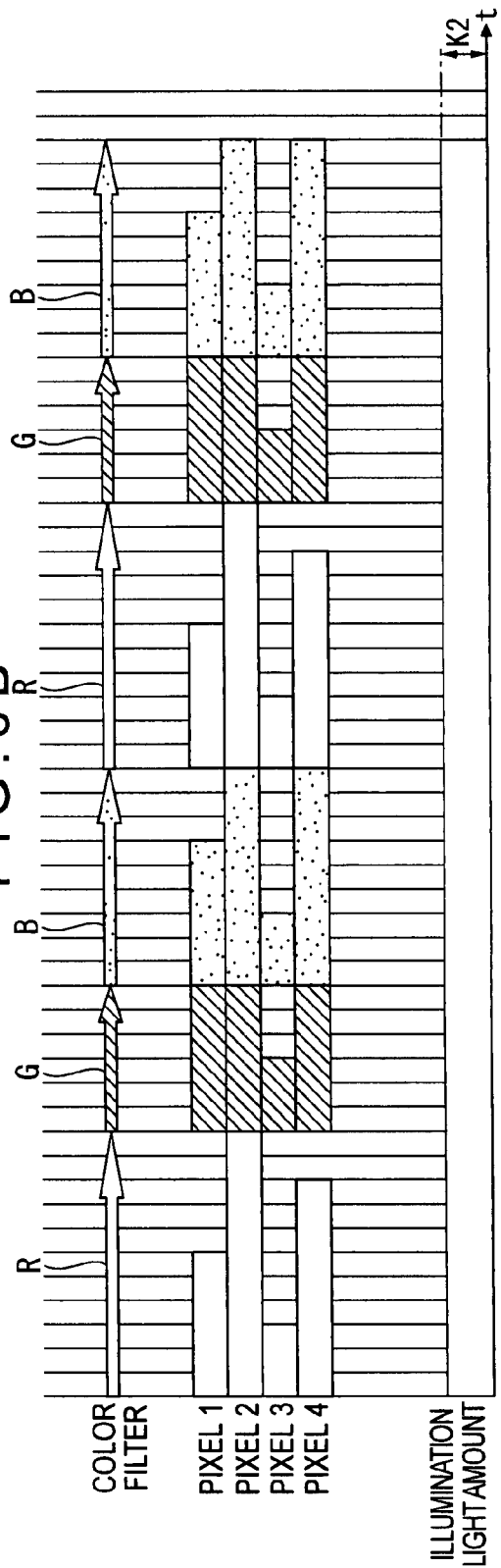

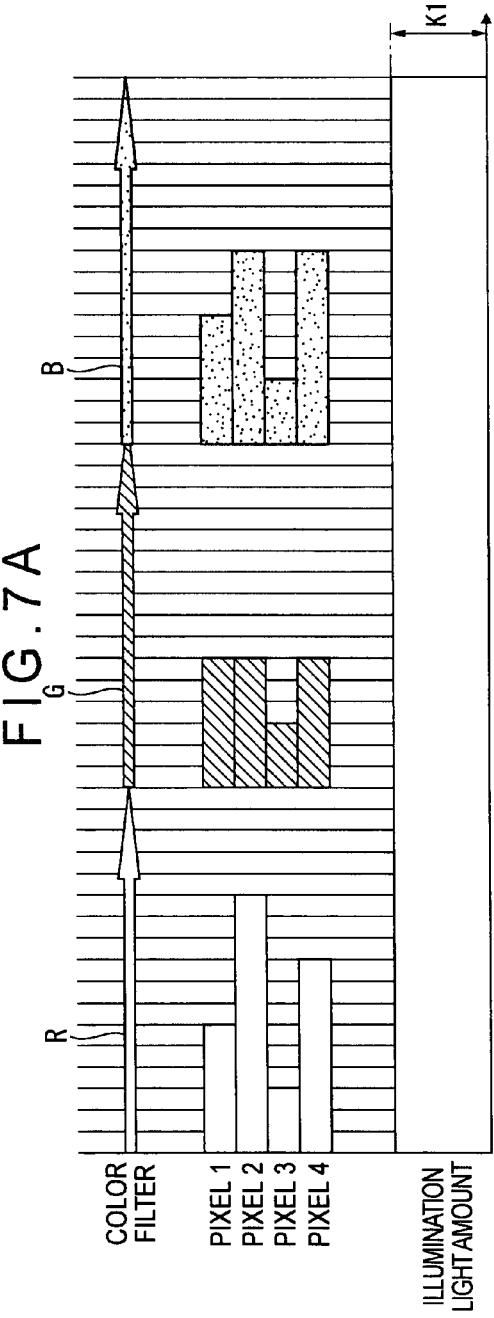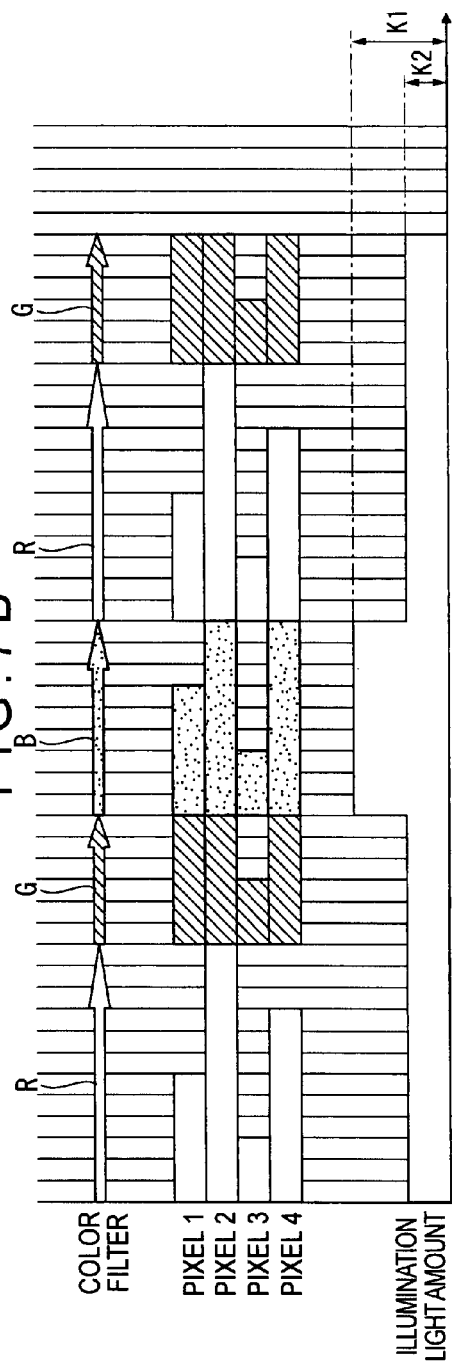

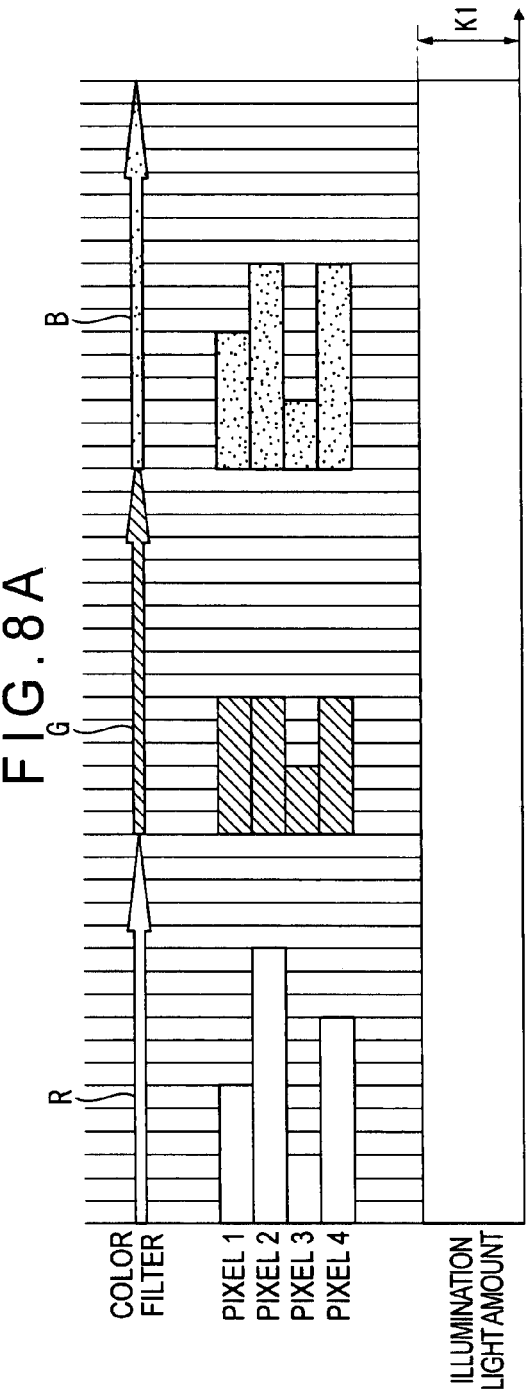
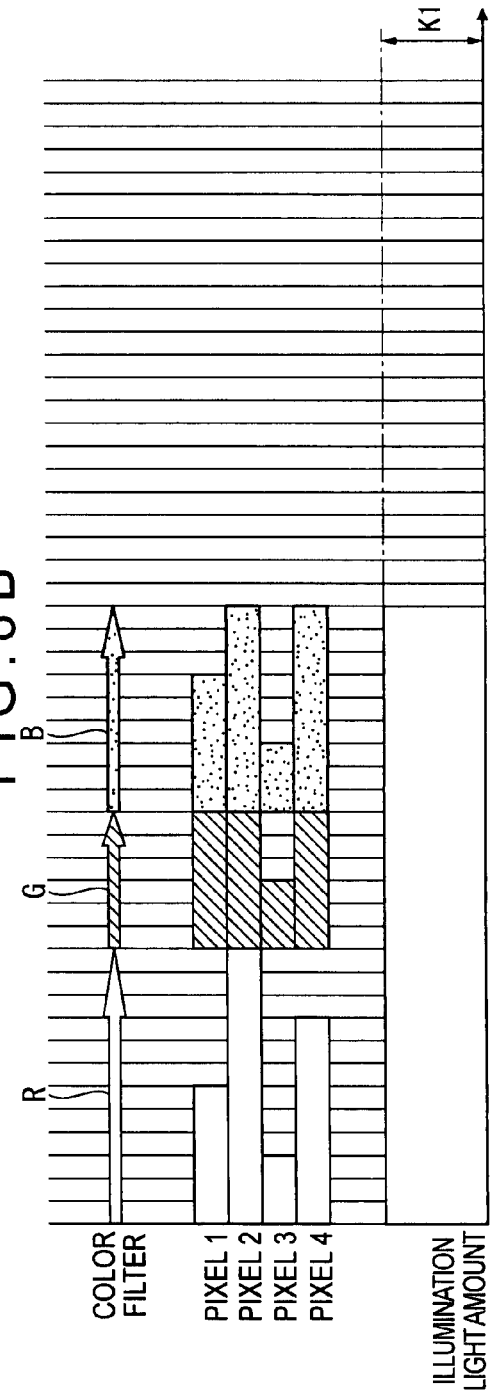

US 7,942,534 B2

PROJECTOR FOR ACHIEVING A WIDE VARITY OF GRADATION AND COLOR REPRESENTATION, PROJECTION SYSTEM, PROGRAM AND RECORDING MEDIUM

The entire disclosure of Japanese Patent Application No. 2006-298560, filed Nov. 2, 2006, is expressly incorporated by reference herein.

BACKGROUND

1. Technical Field

The present invention relates to a projector, a projection system, a program and a recording medium.

2. Related Art

Projectors that form an optical image using a reflective optical modulator for modulating a light beam radiated from a light source in accordance with image information and project the formed optical image in an enlarged manner have been known. Some of the projectors use a DMD (Digital Micromirror Device) as the reflective optical modulator (see, for instance, JP-A-9-54267).

Except for some expensive DMD-equipped projectors for digital movie films, general DMD-equipped projectors employ one set of DMD and use a color wheel to split, in a time-sharing manner, illumination light into three colors (RGB) of light such that the color light is supplied to the DMD and used in PWM (Pulse Width Modulation) by the DMD to generate an image.

However, in such related-art DMD-equipped projectors, although not all of color components are always used in all gradations (256 gradations in general) for a projection image such as one frame of picture, the color wheel is continuously rotated at a constant speed, so that the color light is often absorbed by a light absorbing plate at a high percentage without being projected by the DMD as reflected light, which may result in inefficiency in gradation representation.

The time-sharing-type drive control poses another problem that a spectator experiences color breakup phenomenon (rainbow effect) when the spectator moves the eyes while watching the projection image.

SUMMARY

An advantage of some aspects of the invention is to provide a projector, a projection system, a program and a computer-readable recording medium which can achieve a wide variety of gradation representation and color representation while reducing color breakup and inefficiency in gradation representation.

A projector according to an aspect of the invention, includes: an illumination device that radiates plural colors of light in a time-sharing manner; a reflective optical modulator that forms, based on input image information, an optical image for each of the plural colors of light radiated from the illumination device in a time-sharing manner; a projection optical device that projects the optical images of the plural colors of light formed by the reflective optical modulator; and a controller that controls the illumination device and the reflective optical modulator.

The controller includes: an image information analyzer that analyzes the input image information; and an illumination time controller that dynamically changes and controls illumination time of the plural colors of light by the illumination device based on an analysis result by the image information analyzer.

The reflective optical modulator is not limited to the above-mentioned DMD but may be an LCOS (Liquid Crystal On Silicon) in which liquid crystal is used as a drive element.

The plurality of colors may be three primary colors of red (R), green (G) and blue (B) or may include (W) in addition to the three primary colors or may further include Cyan (C), magenta (M) or yellow (Y) in addition to the three primary colors and (W).

According to the aspect of the invention, by dynamically changing the illumination time of the color light, a variety of gradation representation or color representation can be obtained. In other words, in the time-sharing-type projector, the intensity of luminance of an image recognized by a spectator is determined by a time integration value of the luminance of a light beam radiated from the projection optical device.

Note that, in a projector using a related-art color wheel, the color wheel is adapted to rotate at a constant speed, so that the intensity of luminance can be controlled only by means of projection time of a light beam modulated by the reflective optical modulator.

In contrast, in the projector according to the aspect of the invention, since the illumination time controller dynamically changes the illumination time for each color light from the illumination device, the intensity of the luminance can be controlled by dynamically changing the illumination time of the color light radiated from the illumination device as well as by changing the projection time of the light beam modulated by the reflective optical modulator. Accordingly, by combining these controls, a greater variety of gradation representation or color representation as compared with the related-art can be achieved.

In addition, by dynamically changing the illumination time of the illumination device, the light amount of the illumination by the illumination device can be reduced in accordance with light absorbing time of an absorbing plate of the reflective optical modulator or the illumination device can be shut down when the absorbing plate is absorbing light, thereby improving efficiency in gradation representation.

Further, dynamically changing the illumination time can shorten the light absorbing time of the absorbing plate of the reflective optical modulator as in the time-sharing-type projector, so that color breakup phenomenon can be less recognizable for a spectator by setting the illumination time to be shorter than the frame rate of an ordinary time-sharing.

In the projector according to the aspect of the invention, the illumination device may include: a white-color light source that radiates white light; a color wheel that is disposed on the downstream of the white-color light source on an optical path and partitioned into transmissive color regions in accordance with the plural colors of light, the color wheel rotating to switch the plural colors of light to select a to-be-radiated color of light; and a rotation driver that rotates the color wheel. The illumination time controller may include: an illumination-light-amount calculator that calculates illumination light amounts of the plural colors of light based on the analysis result by the image information analyzer; and a rotation drive controller that outputs a control command to the rotation driver in accordance with the calculated illumination light amounts of the plural colors of light to control a rotation of the color wheel.

According to the aspect of the invention, the illumination time of the color light can be dynamically changed only by embedding software of a rotation controller in a time-sharing-type projector employing a related-art color wheel, so that the invention can be implemented even in an existing projector.

In the projector according to the aspect of the invention, the illumination device may include: a white-color light source that radiates white light; a color wheel that is disposed on the downstream of the white-color light source on an optical path and partitioned into transmissive color regions in accordance with the plural colors of light, the color wheel rotating to switch a to-be-radiated color of light; a rotation driver that rotates the color wheel; and a rotation-axis driver that moves a rotation axis of the color wheel in a plane orthogonal to the optical path of the white light. A ring portion of the color wheel which is formed in a circumferential direction of the color wheel with a rotation center of the color wheel as the center may be partitioned into transmissive color regions corresponding to the plural colors of light at a ratio changeable in accordance with a radius direction position on a line extending from the rotation center to an outer periphery of the color wheel. The illumination time controller may include: an illumination-light-amount calculator that calculates illumination light amounts of the plural colors of light based on the analysis result by the image information analyzer; and a rotation-axis-position controller that outputs a control command to the rotation axis driver in accordance with the calculated illumination light amounts of the plural colors of light to control a rotation axis position of the color wheel.

The ratio of the transmissive color regions of the colors in the ring portion of the color wheel can be changed in accordance with the radius direction positions, for example, by changing the boundary portion along the radium direction between the transmissive color regions of different colors in accordance with the radium direction positions or by displacing the circular locus of the transmitted light beam projected on the color wheel from the rotation center of the color wheel by the rotation of the color wheel.

According to the aspect of the invention, by displacing the rotation axis position of the color wheel by the rotation-axis-position controller, the white-light light source can be transmitted through the color wheel at a ring portion corresponding to the displacement of the rotation axis position, so that the illumination time of the color light can be dynamically changed by switching the color light by the ring portion having different transmissive color regions in accordance with the radial positions.

In the projector according to the aspect of the invention, the illumination device may include: a light-source driver that drives the white-color light source. The illumination time controller may include: a light-source drive controller that outputs a control command to the light-source driver in accordance with the illumination light amounts of the plural colors of light calculated by the illumination-light-amount calculator to adjust a light amount of the white-color light source.

According to the aspect of the invention, in addition to dynamically changing the illumination time of the color light by the illumination device, the light amount of the white-color light source itself is adjusted, so that the contrast ratio of the projection image can be enhanced and the light amount of the color light absorbed by the light absorbing plate can be reduced, which is more advantageous.

In the projector according to the aspect of the invention, the illumination device may include: a light adjustor that includes, to adjust a light amount of light radiated from the white-color light source, a light adjusting member provided to be advanceable to and retractable from an optical path of a light beam radiated from the white-color light source and a light-adjustment driver that drives the light adjusting member. The illumination time controller may include: a light-adjustment controller that outputs a control command to the light-adjustment driver in accordance with the illumination light amounts of the plural colors of light calculated by the illumination-light-amount calculator to adjust a light amount with the light adjustor.

According to the aspect of the invention, the contrast ratio of the projection image can be enhanced as stated above and the light amount can be adjusted only by driving the light adjusting member with the light-adjustment driver, so that the adjustment of the light amount of the light source can be conducted with excellent responsiveness.

In the projector according to the aspect of the invention, the illumination device may include: a plurality of solid light source elements corresponding to the plural colors of light and a light-source-element driver that drives the plurality of solid light source elements. The illumination time controller may include: an illumination-light-amount calculator that calculates illumination light amounts of the plural colors of light based on the analysis result by the image information analyzer; and a light-source-element drive controller that outputs a control command to the light-source-element driver in accordance with the illumination light amounts of the plural colors of light calculated by the illumination-light-amount calculator to adjust light amounts of the solid light source elements corresponding the plural colors of light.

The solid light source elements herein may be an LED (Light Emitting Diode), an LD (Laser Diode) and the like.

According to the aspect of the invention, unlike the related art, no color wheel is required and the illumination can be conducted in a time-sharing manner only by controlling the lighting of the solid light source elements corresponding to the color light, so that the illumination time by the solid light source elements corresponding to the color light can be dynamically changed and the light amount of the light beam radiated from the solid light source elements corresponding to the color light can be changed. Further, the solid light source elements have excellent responsiveness, which is more advantageous to implement the invention.

The invention is also applicable to a projection system in which the projector is connected with an information processor via a transmission unit.

A projection system according to an aspect of the invention, includes: a projector; and an information processor that is connected with the projector via a transmission unit and outputs the image information to the projector. The projector includes: an illumination device that radiates plural colors of light in a time-sharing manner; a reflective optical modulator that forms, based on input image information, an optical image for each of the plural colors of light radiated from the illumination device in a time-sharing manner; and a projection optical device that projects the optical images of the plural colors of light formed by the reflective optical modulator. The information processor includes: an image information analyzer that analyzes the image information output to the projector; an illumination time controller that dynamically changes illumination time of the plural colors of light by the illumination device to control the illumination time based on an analysis result by the image information analyzer, and a data transmitter that sends an illumination time control command by the illumination time controller to the projector via the transmission unit.

According to the projection system, the above-described effects and advantages can be achieved.

In the projection system according to the aspect of the invention, the illumination device may include: a plurality of solid light source elements corresponding to the plural colors of light and a light-source-element driver that drives the plurality of solid light source elements. The illumination time controller may include: an illumination-light-amount calculator that calculates illumination light amounts of the plural colors of light based on the analysis result by the image information analyzer; and a light-source-element drive controller that outputs a control command to the light-source-element driver in accordance with the illumination light amount of the plural colors of light calculated by the illumination-light-amount calculator to adjust a light amount of the solid light source elements corresponding the plurality of colors.

According to the arrangement, the above-described effects and advantages can be achieved.

The invention is also applicable to a program executed on an information processor of the aforesaid projection system and to a recording medium readable by a computer that records the program.

A program according to an aspect of the invention is executed on an information processor that outputs image information to a projector. The projector includes: an illumination device that radiates plural colors of light in a time-sharing manner; a reflective optical modulator that forms, based on input image information, an optical image for each of the plural colors of light radiated from the illumination device in a time-sharing manner; and a projection optical device that projects the optical images of the plural colors of light formed by the reflective optical modulator. The program operates the information processor to function as: an image information analyzer that analyzes the image information output to the projector; or an illumination time controller that dynamically changes and controls illumination time of the plural colors of light by the illumination device based on an analysis result by the image information analyzer.

The recording medium readable by the computer stores the aforesaid program.

According to the aspect of the invention, the above-described effects and advantages can be achieved and the invention can be implemented only by installing the program in a general computer.

BRIEF DESCRIPTION OF THE DRAWINGS

The invention will be described with reference to the accompanying drawings, wherein like numbers reference like elements.

FIG. 1 schematically shows an arrangement of a projector according to a first exemplary embodiment of the invention;

FIG. 6A is a graph showing an advantage of the first exemplary embodiment;

FIG. 6B is another graph showing an advantage of the first exemplary embodiment;

FIG. 7A is another graph showing an advantage of the first exemplary embodiment;

FIG. 7B is another graph showing an advantage of the first exemplary embodiment;

FIG. 8A is another graph showing an advantage of the first exemplary embodiment;

FIG. 8B is another graph showing an advantage of the first exemplary embodiment;

DESCRIPTION OF EXEMPLARY EMBODIMENT(S)

Figure 2A:
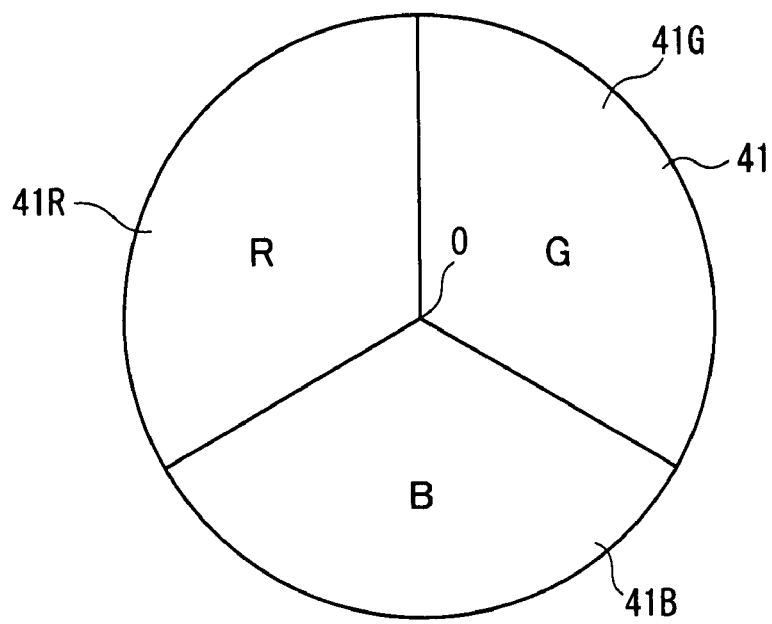
FIG. 2A is a front view showing a structure of a color wheel according to the first exemplary embodiment.

Exemplary embodiments of the invention will be described below with reference to the drawings.

First Exemplary Embodiment

1 Overall Arrangement

FIG. 1 shows an optical system of a projector 1 according to a first exemplary embodiment of the invention. The projector 1 is an optical device that forms an optical image based on image information sent from a personal computer or an AV (Audio-Visual) apparatus and projects the formed optical image on a screen Sc in an enlarged manner. In the first exemplary embodiment, as an optical modulator for forming an optical image in accordance with image information input thereto, a DMD (Digital Micromirror Device) is employed.

Specifically, the projector 1 includes a light source device 2, a rod integrator 3, a color-light switching device 4, a light guiding system 5, the DMD 6 (the optical modulator), a light absorbing plate 7 and a projection optical device 8 (a projection optical device). Note that, in the first exemplary embodiment, the light source device 2, the rod integrator 3, the color-light switching device 4 and the light guiding system 5 function as an illumination device that radiates plural colors of light in a time-sharing manner.

The light source device 2 includes light emitting bodies that emit white light or monochromatic light, an electrical-discharge-type light source lamp 21 (e.g. a halogen lamp, a metal halide lamp or a high-pressure mercury lamp) and a parabolic reflector 22 that aligns a light beam radiated from the light source lamp 21 with an illumination optical axis and radiates the aligned light beam. On the downstream of the parabolic reflector 22, a condenser lens 23 that focuses the light beam radiated from the parabolic reflector 22 on the rod integrator 3 and a mirror 24 that bends the light beam radiated from the parabolic reflector 22 substantially by 90 degrees are provided.

The rod integrator 3 is made from a light-transmissive material and formed in a column having a substantially rectangular cross section. In the rod integrator 3, the light beam from the light source device 2 are multiply-reflected. Accordingly, unevenness in luminance of an image of the light emitting body of the light source device 2 can be reduced and a light beam having uniform illuminance distribution can be generated. The rod integrator 3 has a light source surface that illuminates an image formation area of the DMD 6 in the vicinity of a light emitting surface thereof.

The color-light switching device 4 converts the light beam radiated from the rod integrator 3 into wavelength ranges of red (R), green (G) and blue (B) to supply the plural colors of light to the DMD 6 in a time-sharing manner.

Specifically, the color-light switching device 4 includes a color wheel 41 and a stepping motor 42.

Figure 2B:
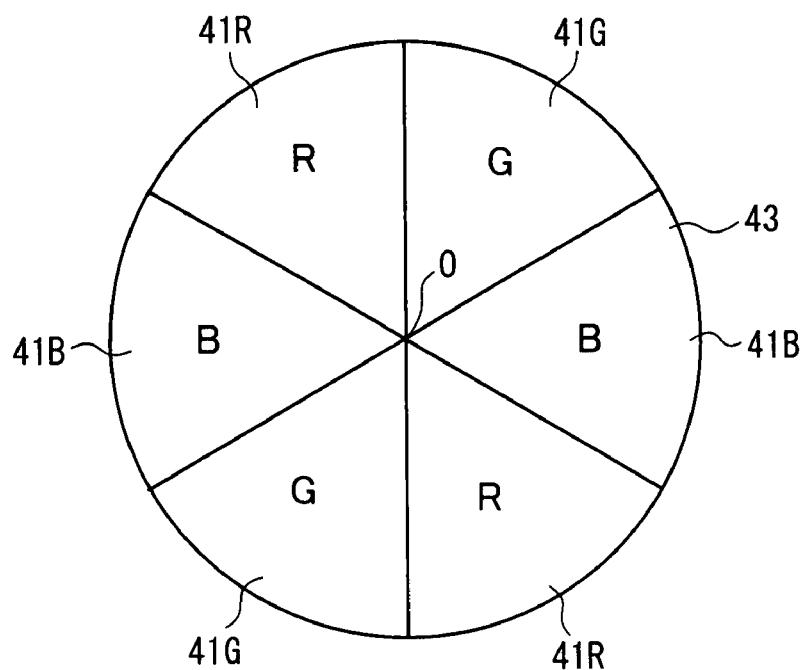
FIG. 2B is a front view showing a structure of another color wheel according to the first exemplary embodiment.

As shown in FIG. 2A, the color wheel 41 is partitioned by three color filters (transmissive color regions) 41R, 41G and 41B in three colors of RGB, each having a fan-like shape around a rotation center O as its center with a central angle of 120 degrees. To switch the color light in a time-sharing manner at shorter intervals, the color wheel may be partitioned by six color filters 41R, 41G and 41B which have a fan-like shape with a central angle of 60 degrees as shown in FIG. 2B as the color wheel 43.

The stepping motor 42 is a rotation driver of which rotary shaft is rotated by a drive pulse, the rotary shaft being connected to the rotation center O of the color wheel 41.

As shown in FIG. 1, a rotary shaft of the color-light switching device 4 is disposed at a position offset toward outside from an illumination axis of the light beam radiated from the rod integrator 3. When a drive pulse is given to the stepping motor 42 to rotate the color wheel 41, the light beam radiated from the rod integrator 3 passes through the color filters 41R, 41G and 41B in a time-sharing manner, so that the color light R, G and B can be radiated in a time-sharing manner.

The light guiding system 5 has a function to guide the light beam radiated from the color-light switching device 4 to the image formation area of the DMD 6, the light guiding system 5 including a first relay lens 51 and a second relay lens 52.

The first relay lens 51 converges and diverges the light beam radiated from the color wheel 41 to increase a light transmission width. The second relay lens 52 converges the diverged light via the first relay lens 51 into collimated light, thereby illuminating the image formation area of the DMD 6.

To improve illumination efficiency, the color-light switching device 4 and the light guiding system 5 are disposed to satisfy an image formation relationship in which the light emitting surface of the rod integrator 3 is conjugated to the image formation area of the DMD 6.

The DMD 6 selects a direction to reflect the light beam incident thereon by changing an inclination of a micromirror, thereby two-dimensionally modulating the incident light beam based on the image information. The incident light beam is thus modulated into modulated light corresponding to a pixel on which the modulated light is projected.

For example, the DMD 6 includes a large number of movable micromirrors that are integrally embedded on a semiconductor chip by micromachine technology based on CMOS wafer process.

Although not shown in the figures, the movable micromirrors rotate around diagonal axes into a bistable state in which the micromirrors are inclined by two predetermined angles ($\pm\theta$). Between the two states, a large optical deflection angle of $4\theta$ can be obtained, so that optical switching can be conducted at an excellent S/N ratio. Accordingly, by switching the rotation direction per predetermined reflex time, a predetermined amount of projection light can be incident on the projection optical device 8.

Some of the light beams incident on the DMD 6 are reflected and deflected in $+2\theta$ direction to be projected by the projection optical device 8 as image light, while some are reflected and deflected in $-2\theta$ direction to be absorbed by the light absorbing plate 7 as unnecessary light.

A surface of the light absorbing plate 7 is, for instance, texture-processed and coated with many antireflection films. The thus-processed surface can prevent reflection of the light beam incident thereon owing to microscopic geometrical effects and the interference principle.

The projection optical device 8 projects the image light modulated by the DMD 6 on the screen Sc in an enlarged manner. The projection optical device 8 includes a prism 81 for changing an optical path and a projection lens 82.

The prism 81 is disposed with an inclination relative to the light beam radiated from the DMD 6 and includes an optical film 83 that reflects or transmits light in accordance with an incident angle of the light and a mirror 84.

Since the light beam radiated from the DMD 6 is incident at a large incident angle, the light beam is reflected by the optical film 83 and then reflected by the mirror 84, so that the light beam passes through the optical film 83 at a smaller incident angle.

Herein, a lens set is employed as the projection lens 82 for a purpose of preventing uncleanness in the projection image on account of chromatic aberration of the color light R, G and B, the lens set including a plurality of condensing elements arranged in an optical axis direction.

2 Arrangement of Controller 9

Figure 3:
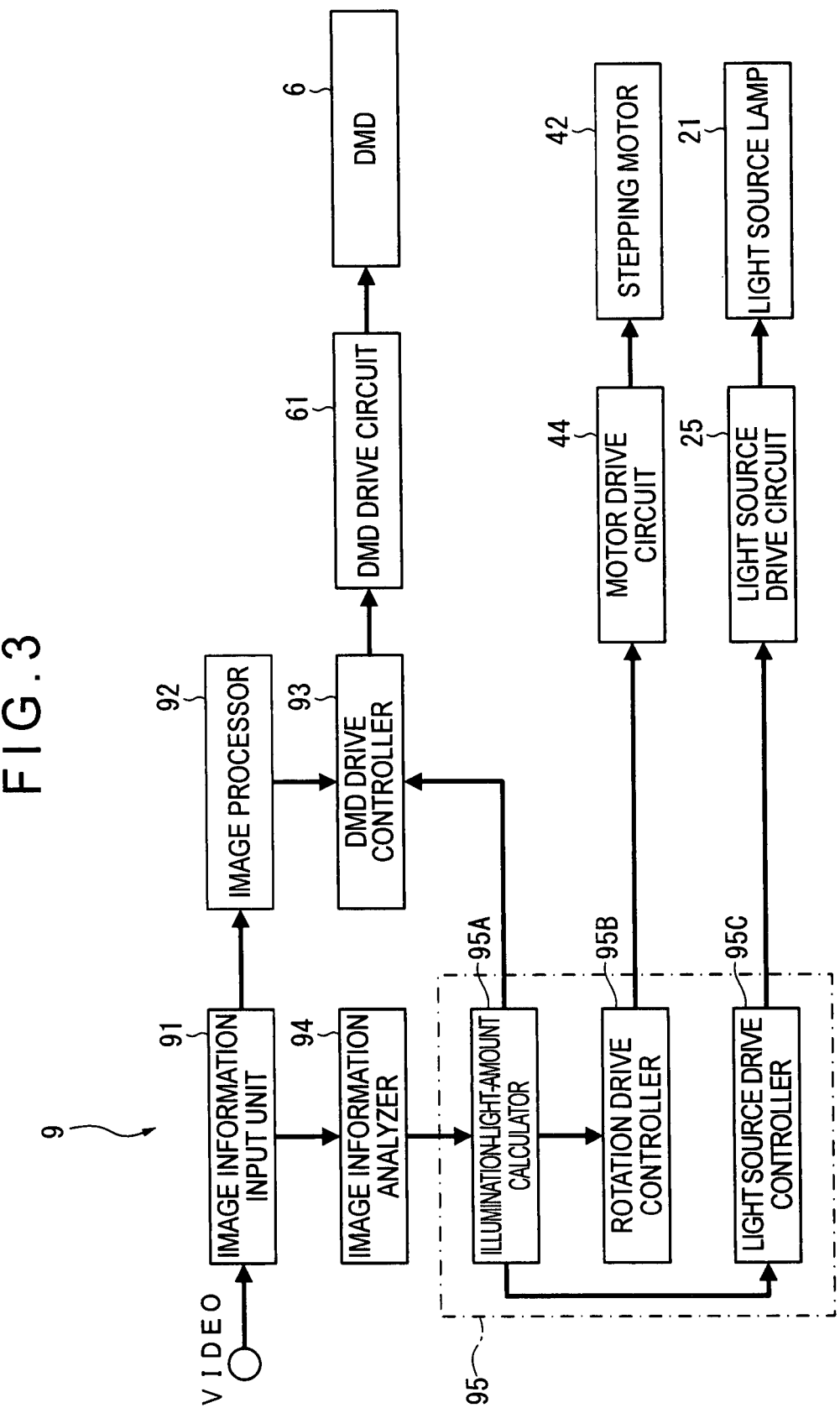
FIG. 3 is a block diagram showing a controller of the projector according to the first exemplary embodiment.

FIG. 3 shows a controller 9 that controls a drive system of the above-described projector 1. Based on image information VIDEO input to the controller 9, the controller 9 controls the DMD 6, the stepping motor 42 and the light source lamp 21 by generating a control command and outputting the control command to a DMD drive circuit 61 that drives the DMD 6, a motor drive circuit 44 that drives the stepping motor 42 of the color-light switching device 4 and a light source drive circuit 25 that drives the light source lamp 21 of the light source device 2.

The controller 9 includes an image information input unit 91, an image processor 92, a DMD drive controller 93, an image information analyzer 94 and an illumination time controller 95. The image processor 92, the image information analyzer 94 and the illumination time controller 95 are programs executed on a computing region of the controller 9.

The image information input unit 91 converts image information input from a personal computer or an AV apparatus into image information of R, G and B to output the converted image information to the image processor 92 and the image information analyzer 94.

The image information is input to the image information input unit 91 via a digital transmission terminal such as a DVI (Digital Visual Interface) terminal and a USB (Universal Serial Bus) terminal or via an analog transmission terminal such as a D-Sub terminal. The image information that is input via the digital transmission terminal is decoded in accordance with standards. The image information that is input via the analog transmission terminal is converted to digital data.

The image processor 92 image-processes the image information that is output from the image information input unit 91 to display a suitable image from the DMD 6, the image processing including IP (Interlace Progressive) conversion, resolution conversion, color conversion and $\gamma$ correction. Note that, although not shown in the figures, the image processor 92 includes a frame buffer, so that the image information input to the image processor 92 is accumulated in the frame buffer in frame unit and image-processed in frame unit.

Based on the image information image-processed by the image processor 92, the DMD drive controller 93 generates a drive control signal to drive the DMD 6 in a time-sharing manner in accordance with the color light R, G and B, the generated drive control signal being output to the DMD drive circuit 61.

The drive control signal generated by the DMD drive controller 93 is generated with control information on illumination time from the illumination time controller 95 taken into consideration because the DMD 6 needs to be driven in synchronization with the rotation control of the color wheel 41 of the color-light switching device 4, which will be described in detail below.

The image information analyzer 94 analyzes the R, G and B image information output from the image information input unit 91 and includes a plurality of frame buffers (not shown) that accumulate image information in frame unit. The image information analyzer 94 analyzes the image information in frame unit obtained from the plurality of frame buffers.

Figure 4:
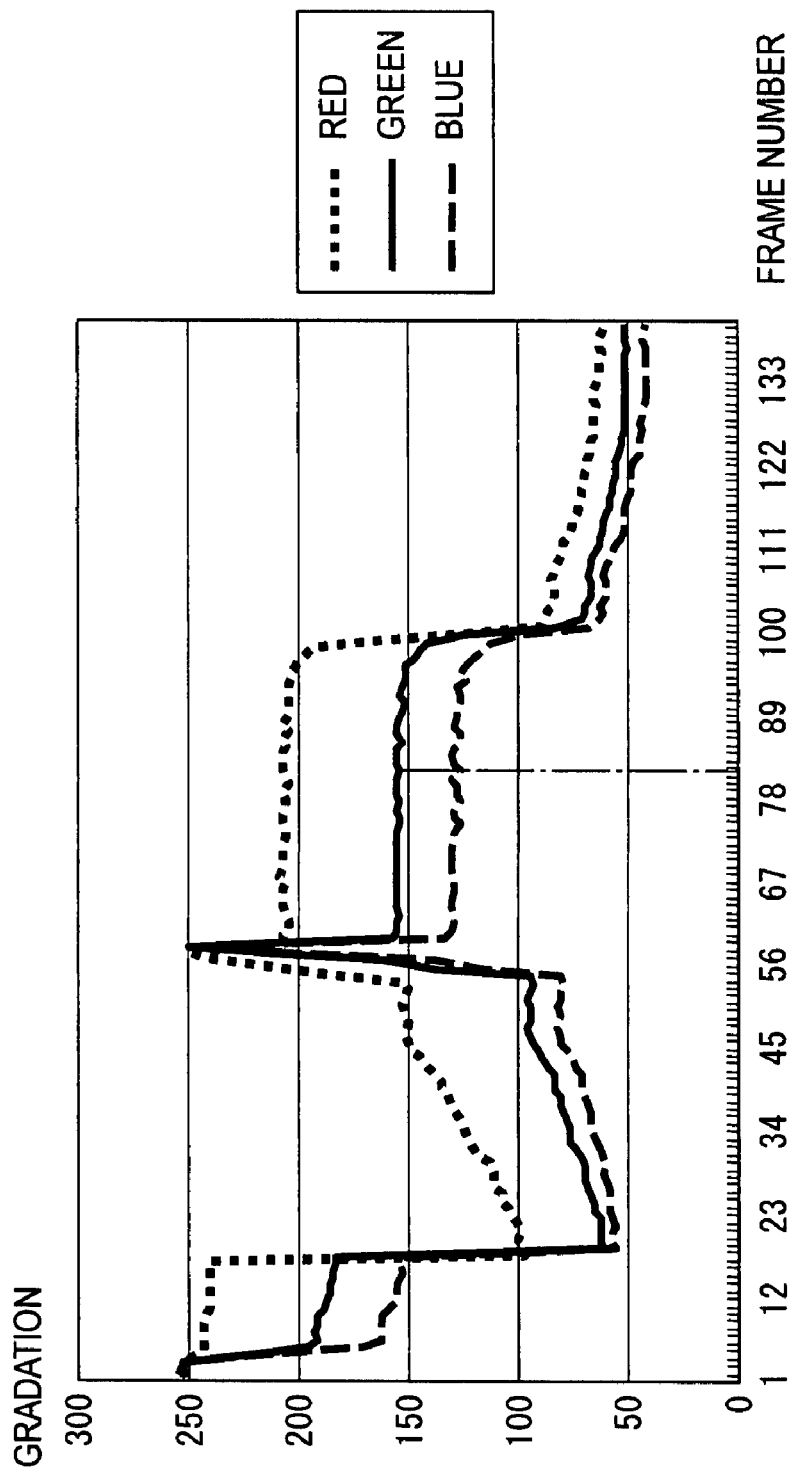
FIG. 4 is a graph showing an image analysis by an image information analyzer according to the first exemplary embodiment.

More specifically, as shown in FIG. 4, the image information analyzer 94 acquires and analyzes changes in gradation values (0 to 255 gradations) of the color light R, G and B of each pixel of the frames in the image information. As seen from FIG. 4, the image gradation values of all of the color light greatly fluctuate in input image information such as a motion picture image and not all the values are always used in full scale (for example, 255 gradations in FIG. 4).

The image information analyzer 94 develops image information of the frames of the input image information in the frame buffers and acquires the gradation values of the color light R, G and B of each frame to analyze for a suitable illumination to the DMD 6 between the frames.

Note that the image information analyzer 94 analyzes a frame previous to the frame of the image information that is forming an optical image on the DMD 6 by the number of the frame buffers, and the image modulation by the DMD 6 is synchronized with the illumination time control by the illumination time controller 95.

The illumination time controller 95 controls the drives of the stepping motor 42 and the light source lamp 21 based on the analysis result by the image information analyzer 94 to dynamically change the illumination time, the illumination time controller 95 including an illumination-light-amount calculator 95A, a rotation drive controller 95B and a light source drive controller 95C.

The illumination-light-amount calculator 95A calculates an illumination light amount from the analysis result by the image information analyzer 94. As described above, in the case of the time-sharing-type projector 1, the spectator recognizes gradation values of the projection image as time integration values of luminance values of the color light R, G and B.

Accordingly, although detailed description will be given below, the illumination-light-amount calculator 95A calculates the illumination light amount from the gradation values of each frame in the image information and calculates the illumination time in which the DMD 6 illuminates with the color light R, G and B and a light amount of white light radiated from the light source lamp 21 based on the calculated illumination light amount.

For example, in FIG. 4, to make the spectator recognize the gradation value 150 of the color light G substantially at the frame number 80, the illumination time of the light G may be shortened by raising the luminance of the white light of the light source lamp 21 or the illumination time by the G light may be lengthened by lowering the luminance of the white light of the light source lamp 21. Note that the illumination time calculated by the illumination-light-amount calculator 95A is output to the rotation drive controller 95B and the DMD drive controller 93.

The rotation drive controller 95B generates a control command to change the rotation of the stepping motor 42 based on the illumination time of the color light R, G and B that is calculated by the illumination-light-amount calculator 95A and outputs the control command to the motor drive circuit 44. More specifically, the rotation drive controller 95B outputs a control command to change the drive pulse per unit time to the motor drive circuit 44. The control command includes, for example, a control command for increasing the drive pulse per unit time to increase the rotation speed or a control command for decreasing the drive pulse per a period of unit time lower the rotation speed.

The light source drive controller 95C outputs a control command to the light source drive circuit 25 based on the light amount of the white light radiated from the light source lamp 21 which is calculated by the illumination-light-amount calculator 95A. Specifically, the light source drive controller 95C changes the light amount from the light source lamp 21 by controlling voltage applied on the light source lamp 21.

3 Effects and Advantages of Projector 1

Figure 5:
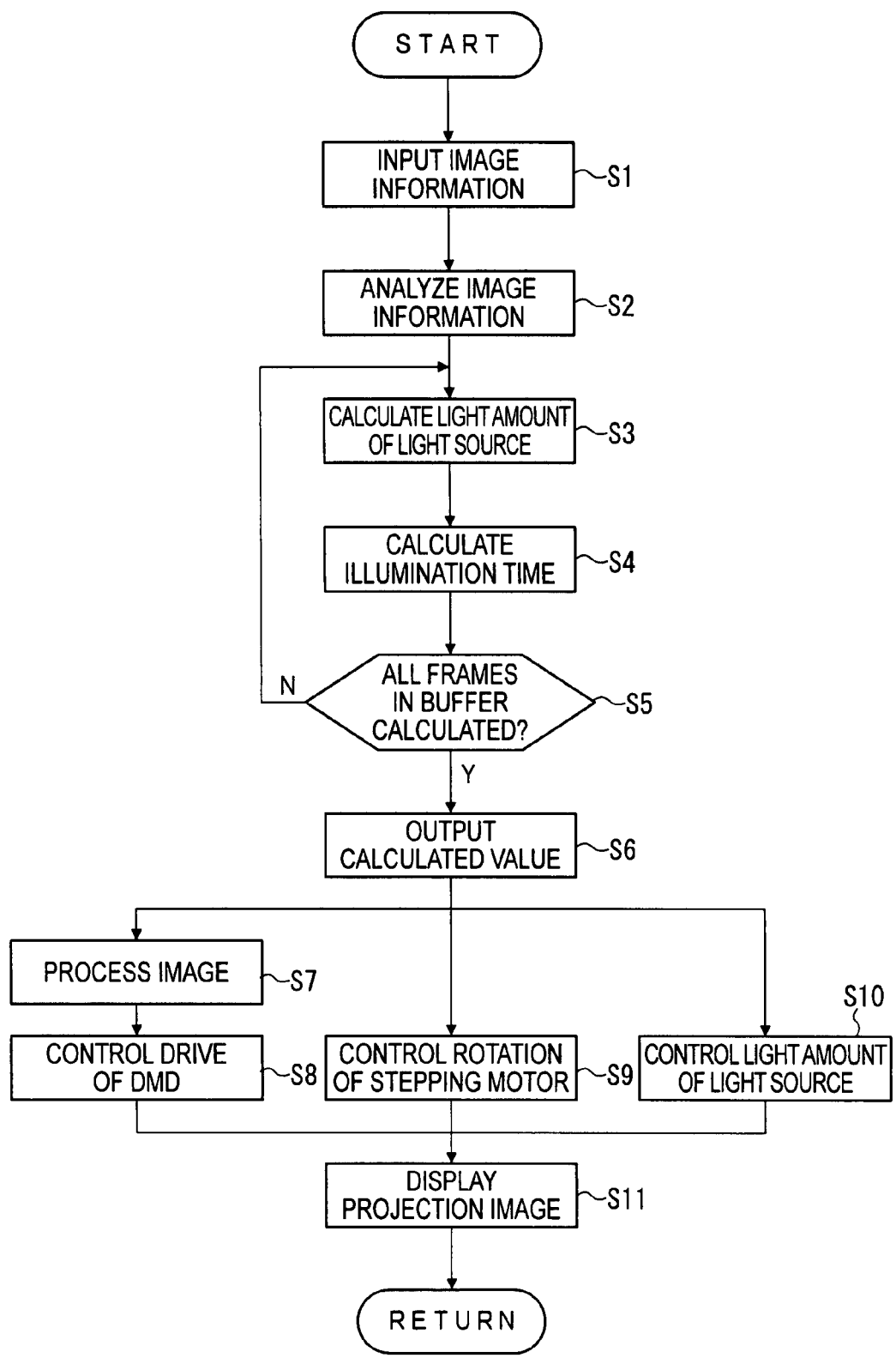
FIG. 5 is a flowchart showing operations of the projector according to the first exemplary embodiment.

Next, operations of the above-described projector 1 will be described based on the flowchart shown in FIG. 5.

When the image information is input to the image information input unit 91 from, for example, the digital transmission terminal, the image information input unit 91 decodes the image information in accordance with a predetermined standard (Processing S1) and outputs the input image information to the image processor 92 and the image information analyzer 94.

The image information analyzer 94 acquires and analyzes changes in gradation values of the color light R, G and B of each pixel of a plurality of precedent frames in the input image information (Processing S2).

The illumination-light-amount calculator 95A of the illumination time controller 95 calculates the light amount of the light source lamp 21 of each frame based on the analysis result by the image information analyzer 94 (Processing S3), calculates the illumination time of the color light R, G and B of each frame (Processing S4), and repeats the light amount calculation and the illumination time calculation until all of the frames in the frame buffers of the image information analyzer 94 are calculated (Processing S5).

When the illumination-light-amount calculator 95A completes the illumination time calculation and the light amount calculation for all of the frames in the frame buffers of the image information analyzer 94, the illumination-light-amount calculator 95A outputs the calculated light amount of the light source lamp 21 to the light source drive controller 95C and outputs the calculated illumination time of the color light R, G and B for each frame to the DMD drive controller 93 and the rotation drive controller 95B (Processing S6).

The image processor 92 sequentially image-processes the frames in an order of completion of output value calculation by the illumination-light-amount calculator 95A (Processing S7), outputs the image information having been image-processed to the DMD drive controller 93. The DMD drive controller 93 generates the control command to drive the DMD 6 based on the image information and the illumination time of the color light R, G and B from the illumination-light-amount calculator 95A and outputs the control command to the DMD drive circuit 61 to control the DMD 6 (Processing S8).

At the same time, the rotation drive controller 95B generates the control command based on the illumination time of the color light R, G and B and outputs the generated control command to the motor drive circuit 44 to control the rotation of the stepping motor 42 (Processing S9).

The light source drive controller 95C generates the control command based on the calculated light amount from the light source and outputs the generated control command to the light source drive circuit 25 to control the light amount of the light source lamp 21 (Processing S10).

Based on the above-described controls, the projection optical device 8 projects the image formed in accordance with the color light R, G and B in a time-sharing manner (Processing S11), so that the spectator recognizes the projection image as a color image.

The process returns to the start to repeat the procedure, starting with the analysis of next-input image information.

How the inefficiency in gradation representation can be prevented by the projector 1 and how the inefficiency in a variety of gradation representation or color representation can be reduced by the projector 1 will be described below based on FIGS. 6A to 8B. Note that, although four pixels are referred in the figures for convenience in describing the dynamic change in the illumination time, all the pixels in an image formation area formed in the DMD 6 should be taken into consideration in an actual operation.

In FIGS. 6A to 8B, the horizontal axis represents time t; lengths of horizontal bars of Pixels 1 to 4 represent modulating time required by the DMD 6 for each pixel and color light; and heights K1, K2 in a vertical direction of the illumination amount represent a light amount of a light beam radiated from the light source device 2.

FIGS. 6A, 7A and 8A show a time-sharing display conducted by a related-art DMD projector. In the time-sharing display, since the color wheel and the like rotate at a constant speed, the illumination time in which the DMD is illuminated with the color filters of the color wheel is constant, so that the gradation representation of the color light R, G and B is restricted by the uniform illumination time.

Hence, even when the gradation display by the DMD on the color light of a certain color (e.g. the color light R) is finished, the next color light G cannot be used for gradation display by the DMD until the illumination time of the color filters has passed.

Accordingly, in transferring the gradation display from the color light R to the color light G, blank time occurs, during which unused light during the blank time is all absorbed by the light absorbing plate.

In contrast, in the projector 1 of the first exemplary embodiment as shown in FIG. 6B, the illumination time of the color light R, G and B via the color filters 41R, 41G and 41B is dynamically changed by the illumination time controller 95, so that the illumination time for each pixel can be synchronized with the illumination time of the pixel that has the highest gradation value (requiring the longest modulation time by the DMD 6) out of the pixels 1 to 4 of the DMD 6.

As a result, since the blank time after the modulation of the color light R, G and B in the related art can be eliminated, the light amount of the light absorbed by the light absorbing plate 7 can be reduced, thereby preventing inefficiency in the gradation representation.

By eliminating the blank time, the color light R, G and B can be continuously displayed in a time-sharing manner, so that the switching rate of the illumination of the color light R, G and B can be increased. Hence, even when the spectator watching the projection image moves the eyes, the color breakup phenomenon can be made less recognizable.

In comparison between FIGS. 6A and 6B, since the color light R, G and B can be radiated twice as many times as that of the related art during the time required for image-display of one frame, even when an illumination light amount K2 per unit time of the light source lamp 21 of the first exemplary embodiment is substantially a half of an illumination light amount K1 per unit time of the light source lamp of the related art, integration value by the time value t will be the same on account of the double radiation in the frame, so that the illumination light amount of the light source lamp 21 can be halved.

In short, since the light amount of the light source lamp 21 can be reduced, power consumption by the projector can be cut down.

Next, in the first exemplary embodiment as shown in FIG. 7B, the color light R and G can be radiated twice as many times as that of the related art shown in FIG. 7A in the same amount of the time T. However, when the color light B is radiated as many times as that of the related art, the illumination light amount of the color light R and G by the light source lamp 21 can be substantially a half (the illumination light amount K2) and the illumination light amount of the color light B from the light source lamp 21 can be maintained the same as that of the related art (the illumination light amount K1).

Thus, by dynamically changing the illumination time of the color light R, G or B, a variety of gradation representation or color representation can be obtained.

In the first exemplary embodiment as shown in FIG. 8B, even when the illumination times are the same, since the illumination time t of the color light R, G or B can be substantially a half of the illumination time t in FIG. 8A, it is possible to proceed to a next frame display in the time same as that of the related art even when a black image is inserted between the frame displays of the color light R, G and B in a time-sharing manner.

Accordingly, by displaying the image of each frame in a short time and inserting the black image, lasting effect and the like can be prevented when updating the frame of the projection image, thereby enhancing the visibility of motion pictures by the spectator.

When inserting the black image, reducing the light of the light source lamp 21 can reduce the light that is radiated from the light source lamp 21 and absorbed by the light absorbing plate 7, thereby reducing unnecessary light.

As described above, according to the first exemplary embodiment, inefficiency in gradation representation can be prevented while a variety of gradation representation or color representation is obtained, so that color breakup phenomenon can be made less recognizable by the spectator.

Second Exemplary Embodiment

Next, a second exemplary embodiment will be described below. In the description below, the portions same as the already-mentioned portions will be given the same reference numerals and the description thereof will be omitted.

In the above-described first exemplary embodiment, the illumination time of the color light R, G and B is dynamically changed by the illumination time controller 95 by controlling the rotation speed of the stepping motor 42 that rotates the color wheel 41 of the color-light switching device 4.

Further, in the first exemplary embodiment, the light amount of the light source radiated from the light source lamp 21 is adjusted by controlling the light source drive circuit 25.

Figure 9:
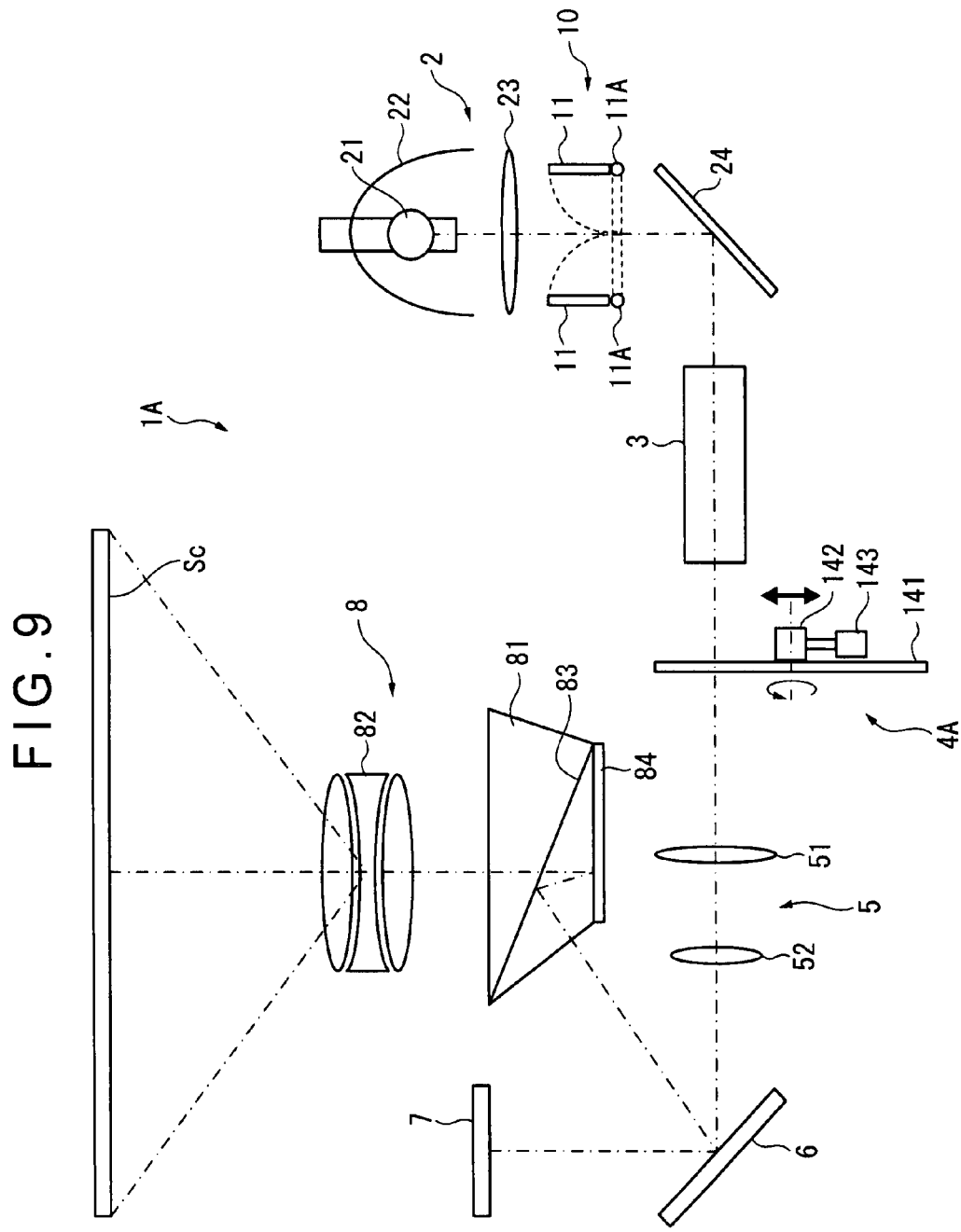
FIG. 9 schematically shows an arrangement of a projector according to a second exemplary embodiment of the invention.

In contrast, a projector 1A according to the second exemplary embodiment differs from the projector 1 of the first exemplary embodiment in that, as shown in FIG. 9, a color-light switching device 4A changes the color filters of a color wheel 141 and that the illumination time of the color light R, G and B is dynamically changed by moving the rotation axis of the color wheel 141 toward and away from the illumination optical axis of the light beam radiated from the rod integrator 3.

The projector 1A of the second exemplary embodiment also differs from the projector 1 in that the projector 1A includes a light adjustor 10 disposed on the downstream of the light source device 2 and the light adjuster 10 is controlled to adjust the light amount of the light beam radiated from the light source device 2.

These differences will be described in detail below.

1 Arrangement of Color-light Switching Device 4A

As shown in FIG. 9, the color-light switching device 4A of the projector 1A of the second exemplary embodiment includes the color wheel 141, a stepping motor 142 and an actuator 143.

As shown in 10A, the color wheel 141 is partitioned by the three color filters 141R, 141G and 141B respectively in the three colors of R, G and B. Two color filters next to each other (e.g. the color filter 141R and the color filter 141B) respectively have protruding portions on the boundary which protrude into the other color filter 141R or 141B at radial positions of line L extending from the rotation center to the outer periphery of the color wheel 141 (the radius of the color wheel). The boundary between the color filters 141B and 141G is arranged in a similar manner.

Accordingly, in the color wheel 141 of the second exemplary embodiment, when comparing whole circumferences of two ring portions W1 and W2 that are located at different radial positions, the ring portions respectively have different illumination time periods for the color light R, G and B.

However, the color wheel that can be used in the second exemplary embodiment is not limited thereto. As shown in FIG. 10B, a color wheel 144 in which the boundary of the adjacent color filters 144R and 144B is defined by curves may be alternatively employed.

Returning to FIG. 9, in the second exemplary embodiment, similarly to the first exemplary embodiment, the stepping motor 142 can be driven by a drive pulse and the rotation speed of the stepping motor 142 can be changed by increasing or decreasing the drive pulse number. However, note that the stepping motor 142 is rotated at a constant speed in the second exemplary embodiment as in the related art.

The actuator 143 may be any known one such as a linear actuator and an actuator using a piezoelectric element, as long as the actuator can function as the rotation driver that moves the position of the rotation axis of the color wheel 141 toward and away from the illumination optical axis of the light beam radiated from the rod integrator 3, the positioning conducted at a high speed.

In the color-light switching device 4A, when the rotation axis of the color wheel 141 is moved toward or apart from the illumination optical axis of the light beam radiated from the rod integrator 3 by the actuator 143, a position on the color wheel 141 through which the light beam radiated from the rod integrator 3 passes is moved toward the rotation center or toward the outer circumference of the color wheel 141.

As described above, in the color filters 141R, 141G and 141B of the color wheel 141 (as in the ring portions W1, W2), the ratio of R, G and B regions in the ring portion varies depending on the radial positions of each ring portion. Accordingly, when the light beam passing position is moved, the position of the ring portion that functions as the color wheel is also moved, so that the illumination time of the color light R, G and B can be dynamically changed.

Note that the color-light switching device that can move the rotation axis position is not limited to the above-described color-light switching device 4A.

Figure 11:
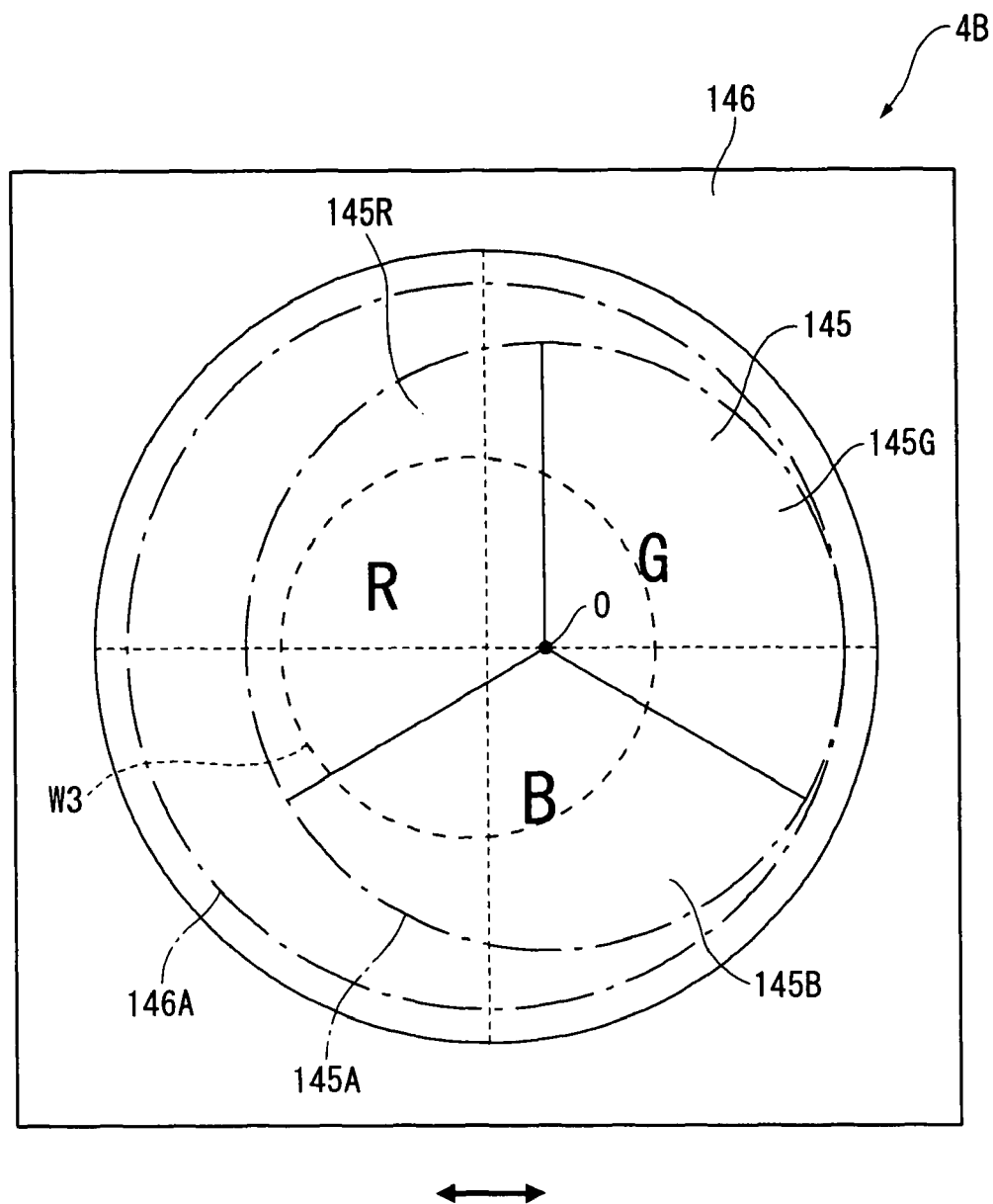
FIG. 11 is a front view schematically showing a structure of a color-light switching device using a color wheel according to a modification of the second exemplary embodiment of the invention.

For instance, as shown in FIG. 11, a color-light switching device 4B that includes a color wheel 145 and a frame 146 for rotatably holding the color wheel 145 can also dynamically change the illumination time of the color light R, G and B.

The color wheel 145 is equally partitioned by the color filters 145R, 145G and 145B and is provided with a gear 145A on the outer circumference.

On the other hand, in the frame 146, an opening larger than the outer diameter of the color wheel 145 is formed. Around the circumference of the opening, a gear 146A is provided.

When the color wheel 145 is rotated around the center O by the stepping motor or the like with the gears 145A, 146A engaged with each other, the color wheel 145 moves inside the opening of the frame 146 eccentrically relative to the center of the opening of the frame 146.

On the other hand, a circular locus W3 (a ring portion) that the light beam radiated from the rod integrator 3 forms in accordance with the rotation of the color wheel 145 is adapted to coincide with the center of the opening in the frame 146.

Accordingly, the circular locus W3 and the rotation position of the color wheel 145 are eccentric, thereby changing the illumination time of the color light R, G and B.

Further, when the frame 146 is moved in a horizontal direction by the actuator relative to the light beam radiated from the rod integrator 3, the center of the opening in the frame 146 is displaced from the ring portion W3, so that the ratio of the regions of color filters 145R, 145G and 145B in the ring portion W3 can be changed.

2 Arrangement of Light Adjustor 10

As shown in FIG. 9, the light adjustor 10 includes a pair of shielding plates 11 (light adjusting members) rotatably supported at ends 11A thereof. In a full open state where a light adjusting amount is 0, the shielding plates 11 are opposingly disposed outside the light beam radiated from the light source device 2.

To reduce the amount of the light beam radiated from the light adjustor 10 during the light adjustment, the pair of shielding plates 11 is rotated in directions to bring the shielding plates 11 closer to each other to adjust a space between the shielding plates 11 in accordance with the amount of the rotation, thereby adjusting the light.

Although not shown in FIG. 9, the light adjustor 10 includes a stepping motor and a transmission mechanism that transmits the rotation of the stepping motor to the rotary shafts of the shielding plates 11. By controlling the rotation of the stepping motor, the space between the pair of shielding plates is adjusted.

Note that the light adjustor applicable to the second exemplary embodiment is not limited to the light adjustor 10, but other light adjustors having known structures may be employed.

3 Arrangement of Controller 9A

Figure 12:
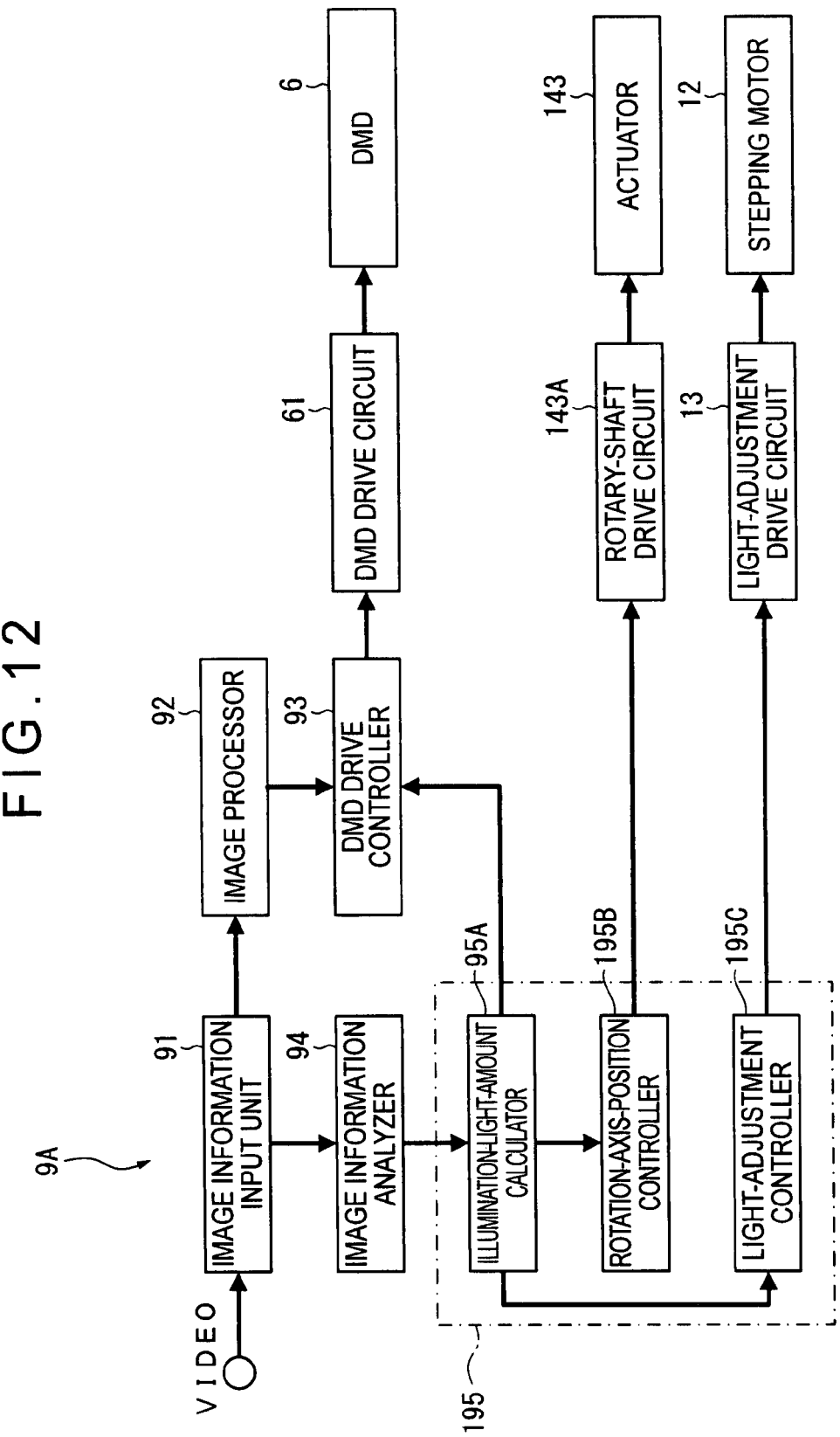
FIG. 12 is a block diagram showing a controller of the projector according to the second exemplary embodiment.

As shown in FIG. 12, the above-described projector 1A is controlled by the controller 9A that differs from the controller 9 of the first exemplary embodiment in an arrangement of the illumination time controller 195.

The illumination time controller 195 includes the illumination-light-amount calculator 95A, a rotation-axis-position controller 195B and a light-adjustment controller 195C.

The illumination-light-amount calculator 95A is not different from the illumination time controller 95 of the first exemplary embodiment in that the illumination-light-amount calculator 95A calculates a suitable illumination time of the color light R, G and B and a suitable light amount of the light beam radiated from the light source device 2 based on the analysis result by the image information analyzer 94, which is similar to the first exemplary embodiment.

Figure 10A:
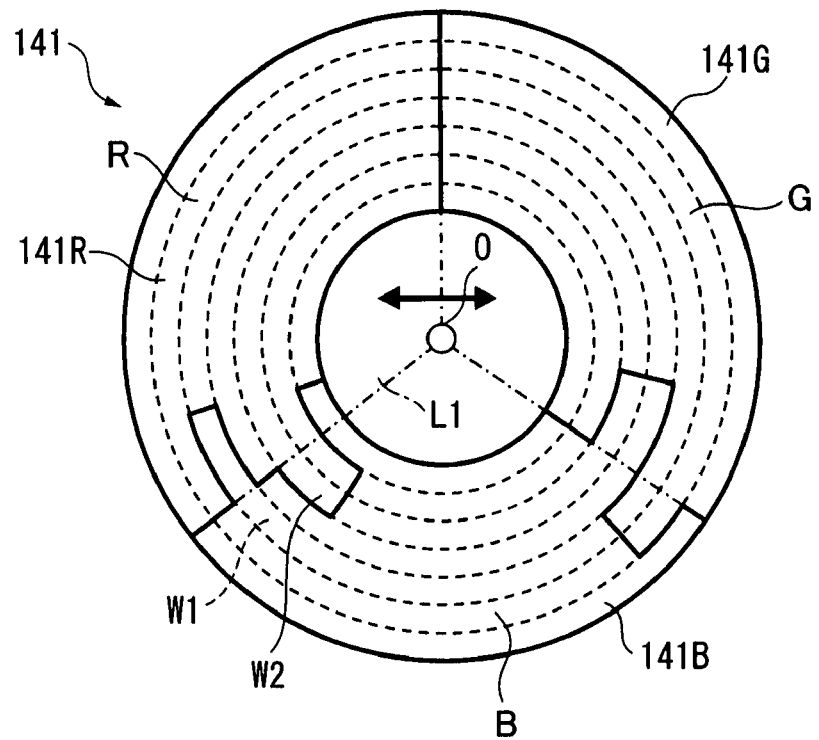
FIG. 10A is a front view showing a structure of a color wheel according to the second exemplary embodiment.
Figure 10B:
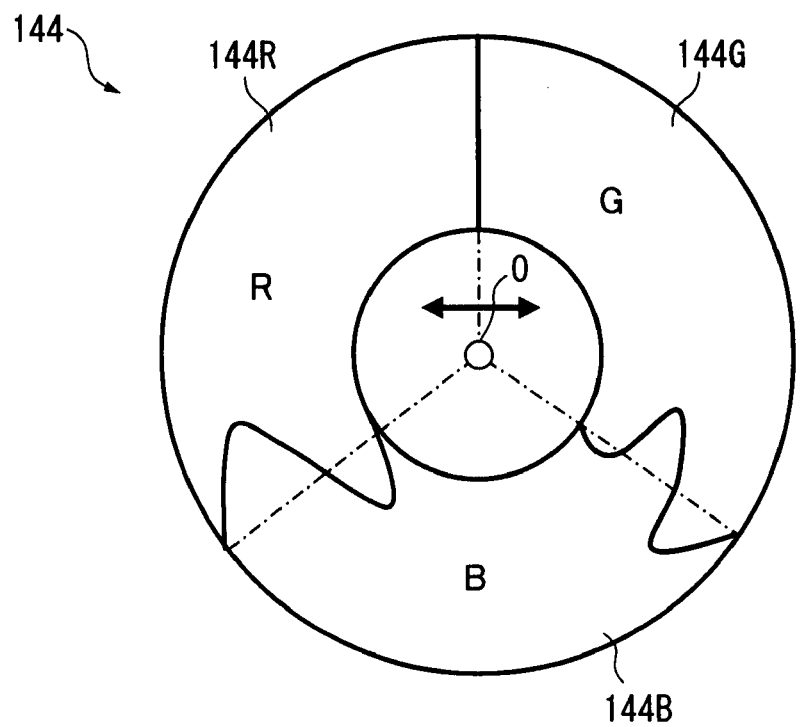
FIG. 10B is a front view showing a structure of another color wheel according to the second exemplary embodiment.

On the other hand, as shown in FIG. 10A, the rotation-axis-position controller 195B calculates a suitable position on the ring portions W1, W2 and the like in the color wheel 141 on which the light beam radiated from the rod integrator 3 is illuminated based on the illumination time of the color light R, G and B calculated by the illumination-light-amount calculator 95A, the rotation-axis-position controller 195B generating a control command to position the rotation axis of the color wheel 141 and outputting the control command to a rotary-shaft drive circuit 143A of the actuator 143. In the positioning control, when the actuator 143 has responsiveness lower than a frame rate of the image information, the actuator 143 is driven over a plurality of frames.

Similarly, the light-adjustment controller 195C controls the light adjustment of the light adjustor 10 based on the light amount of the light source calculated by the illumination-light-amount calculator 95A, the illumination-light-amount calculator 95A generating a control command in accordance with the calculated light amount of the light source and outputting the control command to a light-adjustment drive circuit 13 of the stepping motor 12 of the light adjustor, thereby adjusting the space between the pair of shielding plates 11 of the light adjustor 10 to control the light adjustment in accordance with the calculated light amount of the light source.

The controller 9A conducts the same illumination time control of the color light R, G and B and the light adjustor 10 conduct the same light adjustment control as in the first exemplary embodiment although the controls are conducted on different components. Hence, description thereof will be omitted below.

Third Exemplary Embodiment

Next, a third exemplary embodiment will be described below.

In the above-described first exemplary embodiment, the light source device 2 having the electrical-discharge-type light source lamp 21 is employed and the color-light switching device 4 having the color wheel 41 switches the color light R, G and B.

The projectors 1, 1A according to the first and second exemplary embodiments are adapted to conduct all of the image processing, the image analysis and the illumination time control inside the projectors.

Figure 13:
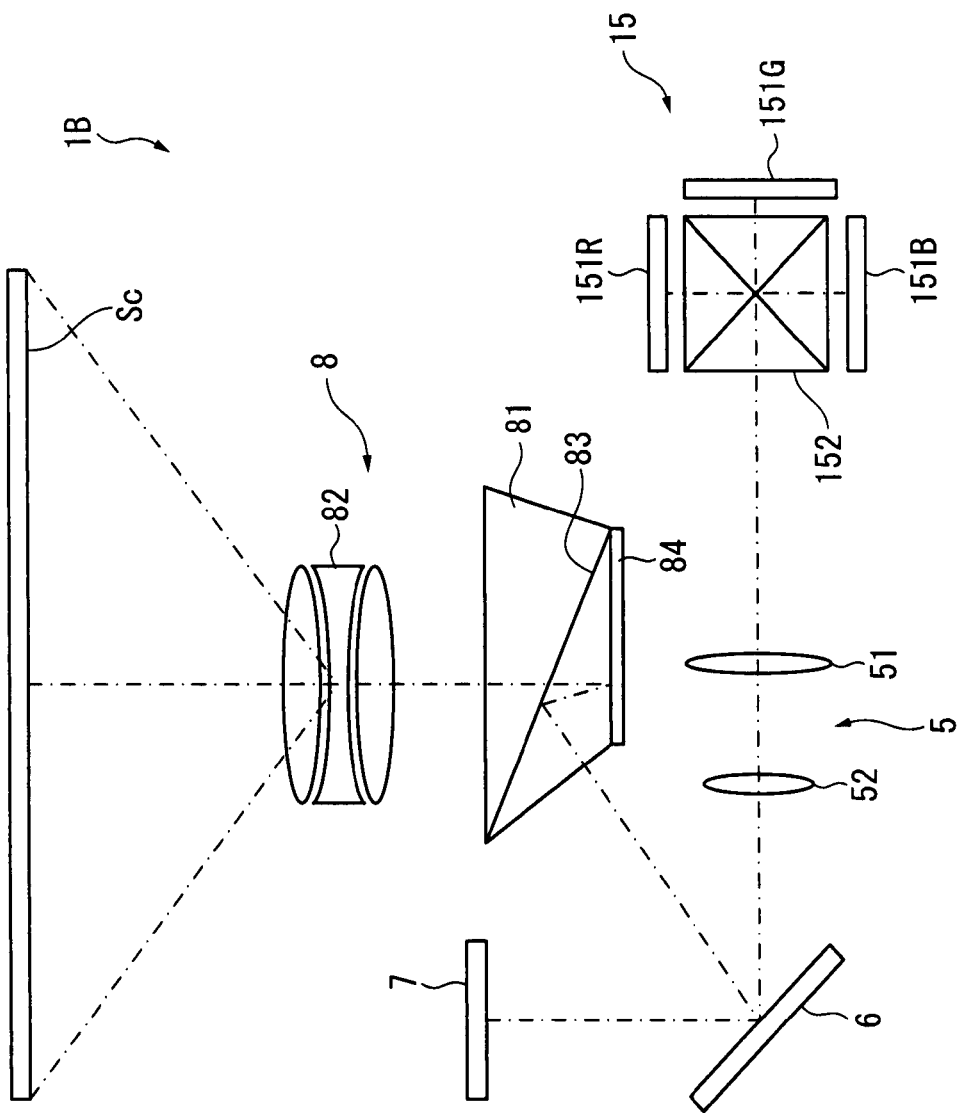
FIG. 13 schematically shows an arrangement of a projector of a projection system according to a third exemplary embodiment of the invention.

In contrast, as shown in FIG. 13, the third exemplary embodiment differs from the aforesaid exemplary embodiments in that a projector 1B of the third exemplary embodiment includes a light source device 15 having three LEDs 151R, 151G and 151B, and that by switching the lighting of the LEDs 151R, 151G and 151B, the LEDs emit the color light of R, G and B in a time-sharing manner.

Figure 14:
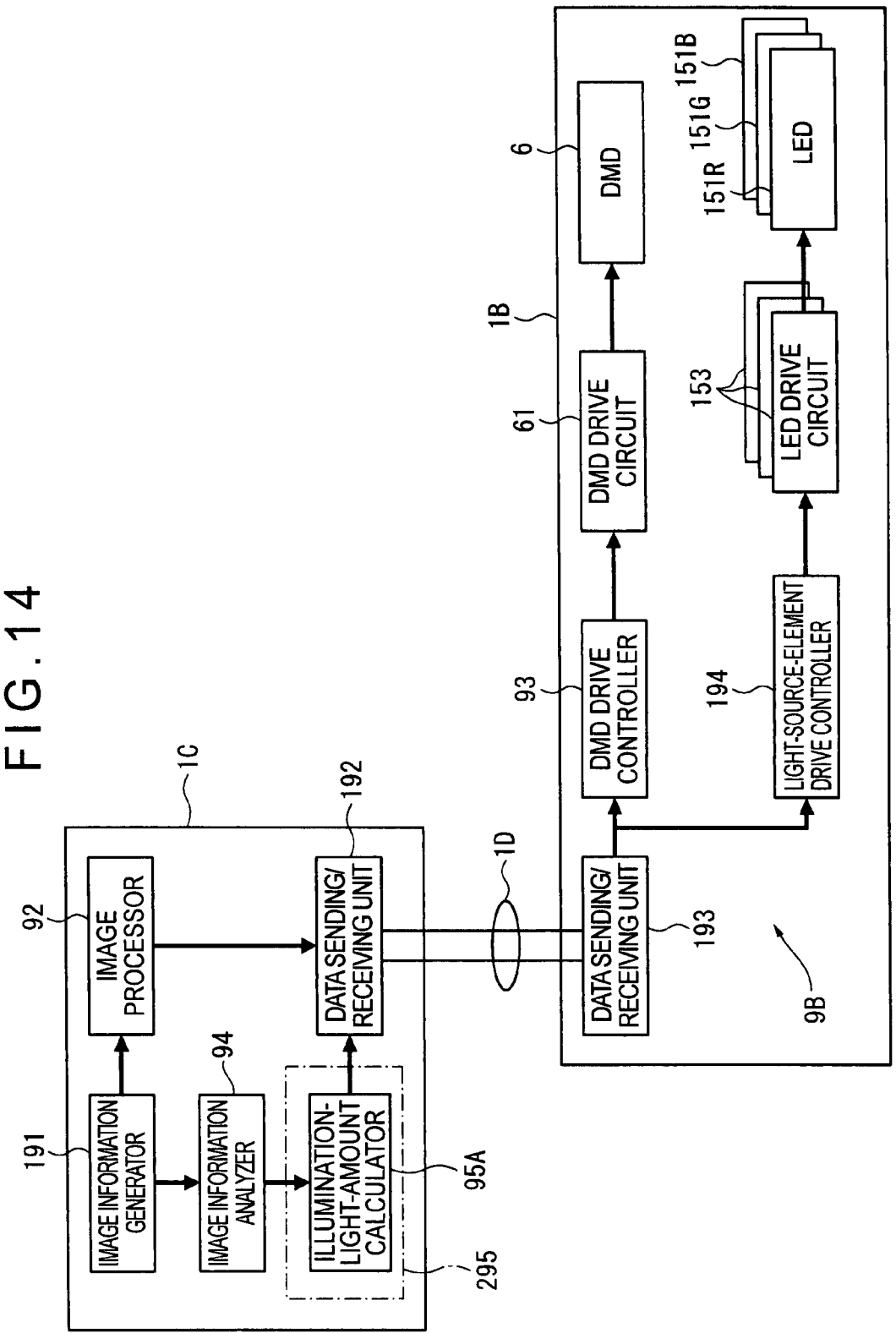
FIG. 14 is a block diagram showing a structure of the projection system according to the third exemplary embodiment.

As shown in FIG. 14, the third exemplary embodiment also differs from the aforesaid exemplary embodiments in that the third exemplary embodiment is a projection system where the projector 1B is connected with a computer 1C by a cable 1D. The image information and illumination control information processed by the computer 1C are transferred to the projector 1B via the cable 1D and the projector 1B displays a projection image based on the transferred information.

These differences will be described in detail below.

1 Arrangement of Light Source Device 15

As shown in FIG. 13, the light source device 15 of the projector 1B includes the LEDs 151R, 151G and 151B and a cross dichroic prism 152.

The LEDs 151R, 151G and 151B each are a plane light emitter having a rectangular plate body on which a plurality of solid light source elements are arranged, the LED 151R radiating red light, the LED 151G radiating green light and the LED 151B radiating blue light. By utilizing photoelectric conversion of semiconductors, the solid light source elements emit light of a predetermined wavelength when a voltage is applied thereon.

Although the LEDs are employed as the solid light source elements in the third exemplary embodiment, the arrangement is not limited thereto. A plane LD (Laser Diode) or an LED that is not a plane light emitter and has only one solid light source element may be alternatively used.

The cross dichroic prism 152 is constituted by four right-angle prisms adhered together in a square shape in plan view. Two dielectric multi-layer films are formed on the boundaries of the right-angle prisms.

One of the two dielectric multi-layer films reflects light having a wavelength of red light region and transmits light having a wavelength of green light region. The other reflects light having a wavelength of blue right region and transmits light having a wavelength of green light region.

The LED 151G is directed in the illumination optical axis direction of the light source device 15 and disposed to face a side surface of the cross dichroic prism 152. The other LEDs 151R and 151B are respectively disposed to face side surfaces of the cross dichroic prism 152, the side surfaces being next to the side surface facing the LED 151G. Accordingly, the color light is radiated from the LEDs 151R, 151B and 151G along the common illumination optical axis.

2 Arrangement of Projection System

The projection system according to the third exemplary embodiment has an arrangement where the projector 1B is connected with the computer 1C (an information processor) by the cable 1D.

The cable 1D is a cable that can provide a digital and bi-directional communication in conformity with the standards such as USB 2.0.

The controller 1C includes an image information generator 191, the image processor 92, the image information analyzer 94, an illumination time controller 295 and a data sending/receiving unit 192 all of which are programs executed on a computing processing device of the computer 1C.

The image information generator 191 generates image information to be processed by the image processor 92. The image information is conducted by decoding a file compressed in the MPEG2 format stored in a hard disk (not shown) to output the decoded image information to the image processor 92 and the image information analyzer 94.

The image processor 92 controls the DMD 6 of the projector 1B to form a suitable image. The image processor 92 in the third exemplary embodiment has no difference from the image processor 92 in the first exemplary embodiment except for that the processed image information is output to the data sending/receiving unit 192 in the third exemplary embodiment.

The image information analyzer 94 analyses the image information generated by the image information generator 191. As in the first exemplary embodiment, the image information analyzer 94 analyses a frame previous to the frame of the image information being processed by the image processor 92.

In the third exemplary embodiment, the illumination time controller 295 only includes the illumination-light-amount calculator 95A.

The illumination-light-amount calculator 95A in the third exemplary embodiment is the same as the illumination-lightamount calculator 95A in the first exemplary embodiment except for that the calculated illumination time of the color light R, G and B and the control information relating to the light amount of the light source are output to the data sending/receiving unit 192.

The data sending/receiving unit 192 sends the image information that is image-processed by the image processor 92 and the control information relating to the illumination time and the light amount of the light source which are calculated by the illumination-light-amount calculator 95A to the projector 1B via the cable 1D, the data being encoded in conformity with communication standards before being sent.

A controller 9B of the projector 1B includes the DMD drive controller 93 that is the same as the DMD drive controller 93 in the first exemplary embodiment, a data sending/receiving unit 193 and a light-source-element drive controller 194.

The data sending/receiving unit 193 decodes the image-processed and encoded image information and the control information which are sent from the computer 1C, the data sending/receiving unit 193 outputting the decoded data to the DMD drive controller 93 and the light-source-element drive controller 194.

The DMD drive controller 93 controls the drive of the DMD drive circuit 61 based on the image information and the control information relating to the illumination time of the color light R, G and B which are received by the data sending/receiving unit 193 such that the DMD 6 can modulate the light.

The light-source-element drive controller 194 generates a control command to the LED drive circuit 153 that drives the LEDs 151R, 151G and 151B based on the control information for the illumination time and the light amount of the light source which are received by the data sending/receiving unit 193.

In the third exemplary embodiment, since the LED drive circuit 153 is provided for each of the LEDs 151R, 151G and 151B, the light-source-element drive controller 194 dynamically changes the illumination time of the color light R, G and B by outputting a control command relating to timing for switching the lighting of the LEDs 151R, 151G and 151B to the LED drive circuits 153 based on the control information relating to the illumination time. On the other hand, the light-source-element drive controller 194 adjusts the light amount when the LEDs 151R, 151 and 151B are turned on based on the control information relating to the light amount of the light source, thereby adjusting the light amount of the light source.

In other words, in the third exemplary embodiment, only by generating the control information to control the LED light sources 151R, 151G and 151B and controlling the LEDs 151R, 151G and 151B based on the generated control information, the dynamic change in the illumination time of the color light R, G and B and the adjustment of the light amount of the light source can be conducted at the same time.

3 Operations of Projection System

Figure 15:
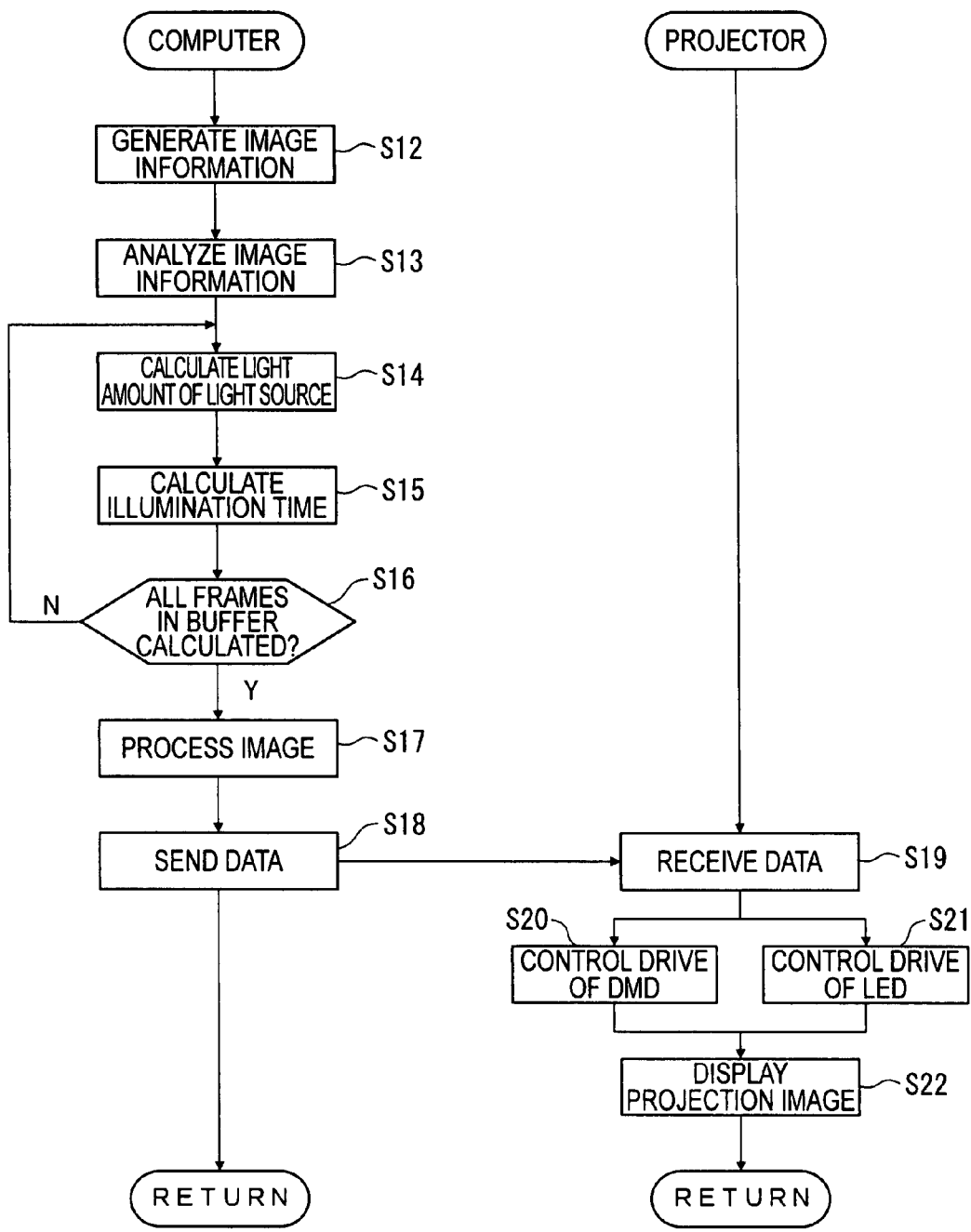
FIG. 15 is a flowchart showing operations of the projection system according to the third exemplary embodiment.

Next, operations of the above-described projection system will be described based on the flowchart shown in FIG. 15.

The image information generator 191 of the computer 1C decodes the compressed image file into a plurality of image information frames to sequentially output the frames to the image processor 92 and the image information analyzer 94 (Processing S12).

The image information analyzer 94 accumulates the frames in the frame buffer and analyzes the frames (Processing S13) to output the analysis result to the illumination-light-amount calculator 95A. The illumination-light-amount calculator 95A calculates the light amount of the light source based on the analysis result (Processing S14) and calculates the illumination time of the color light R, G and B (Processing S15).

The illumination-light-amount calculator 95A calculates the illumination time and the light amount of the light source for all of the frames accumulated in the frame buffer (Processing S16). After the completion of Processing S16, the image processor 92 starts the image processing of the image information in frame unit (Processing S17).

The data sending/receiving unit 192 synchronizes the image information in frame unit that has been processed by the image processor 92 with the control information relating to the illumination time of the color light R, G and B and the light amount of the light source, the data sending/receiving unit 192 encoding the information to send the encoded information to the projector 1B via the cable 1D (Processing S18).

When the data sending/receiving unit 193 of the projector 1B receives the information from the computer 1C, the data sending/receiving unit 193 decodes the received information to output the image information and the control information relating to the illumination time of the color light R, G and B to the DMD drive controller 93 and to output the control information relating to the illumination time of the color light R, G and B and the light amount of the LED light sources 151R, 151G and 151B to the light-source-element drive controller 194 (Processing S19).

The DMD drive controller 93 outputs a control command to the DMD drive circuit 61 based on the control information relating to the image information and the illumination time of the color light R, G and B to control the drive of the DMD 6 (Processing S20).

At the same time, the light-source-element drive controller 194 outputs a control command to the LED drive circuit 153 based on the control information relating to the illumination time of the color light R, G and B and the light amount of the light source to control the drives of the LEDs 151R, 151G and 151B (Processing S21).

Also in the thus-arranged third exemplary embodiment, the effects and advantages same as those of the above-described exemplary embodiments can be obtained. Further, by employing the computer 1C whose image processing has been recently speeded up, no costly graphic processor is required for the projector 1B in order to achieve an effect or an advantage of some aspects of the invention, which is preferable to reduce the manufacturing cost of the projector 1B.

Since the light source device 15 includes the LEDs 151R, 151G and 151B for the three colors, only by controlling the LED drive circuit 153, the control of the illumination time of the color light R, G and B and the light amount control of the LEDs 151R, 151G and 151B can be simultaneously conducted, thereby simplifying the processing by the controller 9B.

Modifications of Exemplary Embodiments

The scope of the invention is not limited to the above-described exemplary embodiments but includes following modifications.

In the first exemplary embodiment, the color wheel 41 is partitioned by the three color filters 41R, 42G and 41B of the three colors of R, G and B. However, the arrangement is not limited thereto and the color wheel may be partitioned by four color filters of white, R, G and B.

In the third exemplary embodiments, the light source device 15 having the LEDs 151R, 151G and 151B is used in the projector 1B of the projection system. However, in a projector having a plurality of LEDs, the controller may include a light-source-element drive controller similar to that in the third exemplary embodiment.

In the above-described exemplary embodiments, the DMD 6 is employed as the reflective optical modulator. However, the invention may be utilized for a reflective optical modulator using light crystal such as liquid crystal on silicon (LCOS). In short, as long as the projector displays a color image in a time-sharing manner, the invention is applicable.

Specific structures, processing procedure and the like to implement the invention may be any other one as long as an object of the invention can be achieved.

What is claimed is:

1. A projector, comprising:
   an illumination device that radiates plural colors of light in a time-sharing manner;
   a reflective optical modulator that forms, based on input image information, an optical image for each of the plural colors of light radiated from the illumination device in a time-sharing manner;
   a projection optical device that projects the optical images of the plural colors of light formed by the reflective optical modulator; and
   a controller that controls the illumination device and the reflective optical modulator, the controller including: an image information analyzer that analyzes the input image information; and an illumination time controller that dynamically changes and controls illumination time of the plural colors of light by the illumination device based on an analysis result by the image information analyzer, wherein
   the illumination device includes:
   a white-color light source that radiates white light;
   a light-source driver that drives the white-color light source;
   a color wheel that is disposed on the downstream of the white-color light source on an optical path and partitioned into transmissive color regions in accordance with the plural colors of light, the color wheel rotating to switch the plural colors of light to select a to-be-radiated color of light; and
   a rotation driver that rotates the color wheel, and
   the illumination time controller includes:
   an illumination-light-amount calculator that calculates illumination light amounts of the plural colors of light based on the analysis result by the image information analyzer;
   a light-source drive controller that outputs a control command to the light-source driver in accordance with the illumination light amounts of the plural colors of light calculated by the illumination-light-amount calculator to adjust a light amount of the white-color light source; and
   a rotation drive controller that outputs a control command to the rotation driver in accordance with the calculated illumination light amounts of the plural colors of light to control a rotation of the color wheel.

2. The projector according to claim 1, wherein
   the illumination device includes: a light adjustor that includes, to adjust a light amount of light radiated from the white-color light source, a light adjusting member provided to be advanceable to and retractable from an optical path of a light beam radiated from the white-color light source and a light-adjustment driver that drives the light adjusting member, and
   the illumination time controller includes: a light-adjustment controller that outputs a control command to the light-adjustment driver in accordance with the illumination light amounts of the plural colors of light calculated by the illumination-light-amount calculator to adjust a light amount with the light adjustor.

3. A projection system, comprising:
   a projector including: an illumination device that radiates plural colors of light in a time-sharing manner; a reflective optical modulator that forms, based on input image information, an optical image for each of the plural colors of light radiated from the illumination device in a time-sharing manner; and a projection optical device that projects the optical images of the plural colors of light formed by the reflective optical modulator, and
   an information processor that is connected with the projector via a transmission unit and outputs the image information to the projector, wherein
   the information processor includes:
   an image information analyzer that analyzes the image information output to the projector;
   an illumination time controller that dynamically changes illumination time of the plural colors of light by the illumination device to control the illumination time based on an analysis result by the image information analyzer, and
   a data transmitter that sends an illumination time control command by the illumination time controller to the projector via the transmission unit, and
   the illumination device includes:
   a white-color light source that radiates white light;
   a light-source driver that drives the white-color light source;
   a color wheel that is disposed on the downstream of the white-color light source on an optical path and partitioned into transmissive color regions in accordance with the plural colors of light, the color wheel rotating to switch the plural colors of light to select a to-be-radiated color of light; and
   a rotation driver that rotates the color wheel, and
   the illumination time controller includes:
   an illumination-light-amount calculator that calculates illumination light amounts of the plural colors of light based on the analysis result by the image information analyzer;
   a light-source drive controller that outputs a control command to the light-source driver in accordance with the illumination light amounts of the plural colors of light calculated by the illumination-light-amount calculator to adjust a light amount of the white-color light source; and
   a rotation drive controller that outputs a control command to the rotation driver in accordance with the calculated illumination light amounts of the plural colors of light to control a rotation of the color wheel.

4. A program that is executed on an information processor that outputs image information to a projector, the projector including: an illumination device that radiates plural colors of light in a time-sharing manner; a reflective optical modulator that forms, based on input image information, an optical image for each of the plural colors of light radiated from the illumination device in a time-sharing manner; and a projection optical device that projects the optical images of the plural colors of light formed by the reflective optical modulator,
   the program operating the information processor to function as: an image information analyzer that analyzes the image information output to the projector; or an illumination time controller that dynamically changes and controls illumination time of the plural colors of light by the illumination device based on an analysis result by the image information analyzer, wherein the illumination device includes:

a white-color light source that radiates white light;

a light-source driver that drives the white-color light source;

a color wheel that is disposed on the downstream of the white-color light source on an optical path and partitioned into transmissive color regions in accordance with the plural colors of light, the color wheel rotating to switch the plural colors of light to select a to-be-radiated color of light; and a rotation driver that rotates the color wheel, and the illumination time controller includes:

an illumination-light-amount calculator that calculates illumination light amounts of the plural colors of light based on the analysis result by the image information analyzer;

a light-source drive controller that outputs a control command to the light-source driver in accordance with the illumination light amounts of the plural colors of light calculated by the illumination-light-amount calculator to adjust a light amount of the white-color light source; and a rotation drive controller that outputs a control command to the rotation driver in accordance with the calculated illumination light amounts of the plural colors of light to control a rotation of the color wheel.

5. A recording medium that stores a program in a computer readable manner, wherein the program is executed on an information processor that outputs image information to a projector, the projector including: an illumination device that radiates plural colors of light in a time-sharing manner; a reflective optical modulator that forms, based on input image information, an optical image for each of the plural colors of light radiated from the illumination device in a time-sharing manner; and a projection optical device that projects the optical images of the plural colors of light formed by the reflective optical modulator, and the program operates the information processor to function as: an image information analyzer that analyzes the image information output to the projector; or an illumination time controller that dynamically changes and controls illumination time of the plural colors of light by the illumination device based on an analysis result by the image information analyzer, wherein the illumination device includes:

a white-color light source that radiates white light;

a light-source driver that drives the white-color light source;

a color wheel that is disposed on the downstream of the white-color light source on an optical path and partitioned into transmissive color regions in accordance with the plural colors of light, the color wheel rotating to switch the plural colors of light to select a to-be-radiated color of light; and a rotation driver that rotates the color wheel, and the illumination time controller includes:

an illumination-light-amount calculator that calculates illumination light amounts of the plural colors of light based on the analysis result by the image information analyzer;

a light-source drive controller that outputs a control command to the light-source driver in accordance with the illumination light amounts of the plural colors of light calculated by the illumination-light-amount calculator to adjust a light amount of the white-color light source; and a rotation drive controller that outputs a control command to the rotation driver in accordance with the calculated illumination light amounts of the plural colors of light to control a rotation of the color wheel.

* * * * *